US012724638B2

(12) United States Patent
Sato et al.

(10) Patent No.: US 12,724,638 B2
(45) Date of Patent: Sep. 1, 2026

(54) MANAGEMENT APPARATUS, MANAGEMENT METHOD AND MANAGEMENT PROGRAM

(71) Applicant: NTT, Inc., Tokyo (JP)

(72) Inventors: Masataka Sato, Musashino (JP); Kazuaki Akashi, Musashino (JP); Shingo Horiuchi, Musashino (JP)

(73) Assignee: NTT, Inc., Tokyo (JP)

( * ) Notice: Subject to any disclaimer, the term of this patent is extended or adjusted under 35 U.S.C. 154(b) by 373 days.

(21) Appl. No.: 18/289,240

(22) PCT Filed: May 14, 2021

(86) PCT No.: PCT/JP2021/018403

§ 371 (c)(1),
(2) Date: Nov. 2, 2023

(87) PCT Pub. No.: WO2022/239227

PCT Pub. Date: Nov. 17, 2022

(65) Prior Publication Data

US 2024/0256344 A1 Aug. 1, 2024

(51) Int. Cl.
*G06F 3/00* (2006.01)
*G06F 9/50* (2006.01)

(52) U.S. Cl.
CPC .................................. *G06F 9/5027* (2013.01)

(58) Field of Classification Search
CPC ........................................................ G06F 9/50
See application file for complete search history.

(56) References Cited

U.S. PATENT DOCUMENTS 10,268,419 B1 * 4/2019 Tylik ........................ G06F 3/061
10,452,441 B1 * 10/2019 Subramanian ......... G06N 20/20
2009/0265486 A1 * 10/2009 Jenkins ................ G06F 9/5011 710/36

(Continued)

FOREIGN PATENT DOCUMENTS

WO WO 2016189834 1/2016

OTHER PUBLICATIONS

Orazio P. Attanasio, The intertemporal allocation of consumption: theory and evidence*, (Year: 1995).*

(Continued)

*Primary Examiner* — Lechi Truong
(74) *Attorney, Agent, or Firm* — Fish & Richardson P.C.

(57) ABSTRACT

A management device receives a request for generation of a first entity, and determines whether the first entity needs to consume a resource, on the basis of specification information about the first entity, the specification information being stored in advance. In a case where consumption of a resource is needed, the management device identifies a second entity capable of providing a capacity to be consumed by the first entity, on the basis of entity information that is stored in advance. On the basis of the second entity, the management device determines whether dispensation of the capacity of the resource to be consumed by the first entity is possible, and, if the dispensation is possible, dispenses the capacity to the first entity. When a plurality of first entity generation requests is received, the management device dispenses a capacity of a common resource.

16 Claims, 29 Drawing Sheets

(56) References Cited

U.S. PATENT DOCUMENTS

| | | | | |
|---|---|---|---|---|
| 2011/0151911 | A1* | 6/2011 | Yun | H04W 72/30 455/509 |
| 2016/0253215 | A1* | 9/2016 | Fang | G06F 11/3442 718/104 |
| 2018/0013524 | A1* | 1/2018 | Chien | H04L 5/005 |
| 2018/0024866 | A1* | 1/2018 | Yoshimura | H04L 41/50 709/226 |
| 2018/0129516 | A1 | 5/2018 | Nakanoya | |
| 2020/0015209 | A1* | 1/2020 | Zhang | H04W 68/005 |
| 2021/0391853 | A1* | 12/2021 | Jann | H03B 5/12 |
| 2023/0085448 | A1* | 3/2023 | Hu | H04L 5/0007 |

OTHER PUBLICATIONS

Sato et al., "Flexible Network Resource-Allocation Architecture Using Specification Injection," The 20th Asia-Pacific Network Operations and Management Symposium (APNOMS 2019), Matsue, Japan, Sep. 18-20, 2019, 5 pages.

Sato et al., "Study of Variable Management Architecture for Diverse Networks," IEICE Technical Report, Nov. 2016, 116(324):37-42, 13 pages (with machine translation).

* cited by examiner

Fig. 1

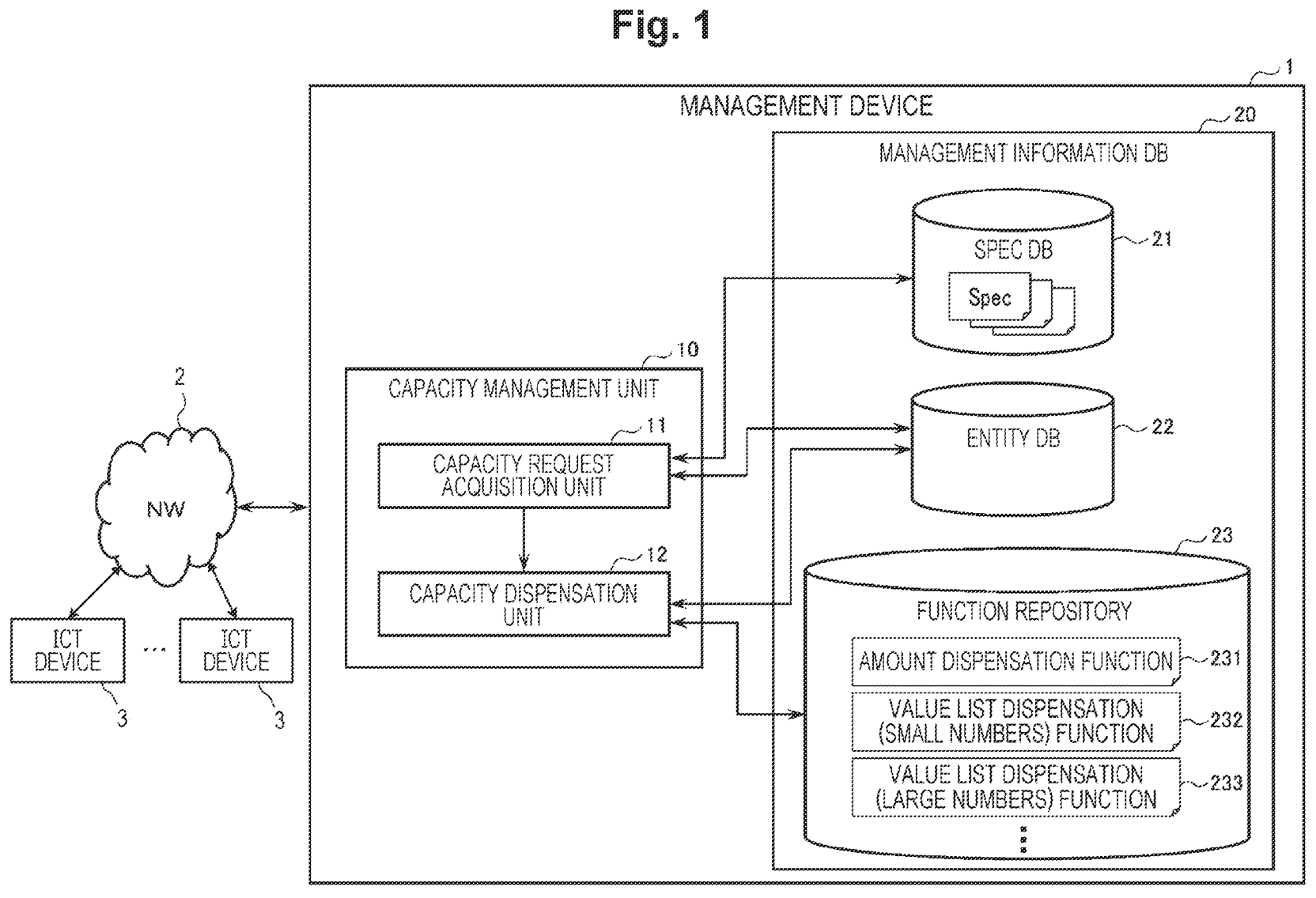

MANAGEMENT DEVICE
1
MANAGEMENT INFORMATION DB
20
SPEC DB
Spec
21
ENTITY DB
22
FUNCTION REPOSITORY
23
AMOUNT DISPENSATION FUNCTION
231
VALUE LIST DISPENSATION (SMALL NUMBERS) FUNCTION
232
VALUE LIST DISPENSATION (LARGE NUMBERS) FUNCTION
233
CAPACITY MANAGEMENT UNIT
10
CAPACITY REQUEST ACQUISITION UNIT
11
CAPACITY DISPENSATION UNIT
12
NW
2
ICT DEVICE
3
ICT DEVICE
3

Fig. 2

| LAYER TYPE | Entity NAME | | MEANING | SYMBOLS IN DRAWINGS |
|---|---|---|---|---|
| PHYSICAL | PD(Physical Device) | | DEVICE | |
| | PP(Physical Port) | | COMMUNICATION PORT OF DEVICE | |
| | PL(Physical Link) | | CONNECTION CABLE BETWEEN DEVICES | |
| LOGICAL | TL(Topological Link) | | CONNECTIVITY BETWEEN DEVICES | |
| | NFD(Network Fowarding Domain) | | FORWARDABLE RANGE IN DEVICE | |
| | TPE(Termination Point Encapsulation) | | TERMINATION POINT OF COMMUNICATION | |
| | FRE (Forwarding Relationship Encapsulation) | NC (Network Connection) | End-End CONNECTIVITY FORMED BY LC AND XC BETWEEN TPE | |
| | | LC (Link Connection) | CONNECTIVITY BETWEEN DEVICES TERMINATED WITH TPE | |
| | | XC (Cross Connect) | CONNECTIVITY IN DEVICE TERMINATED WITH TPE | |

Fig. 8

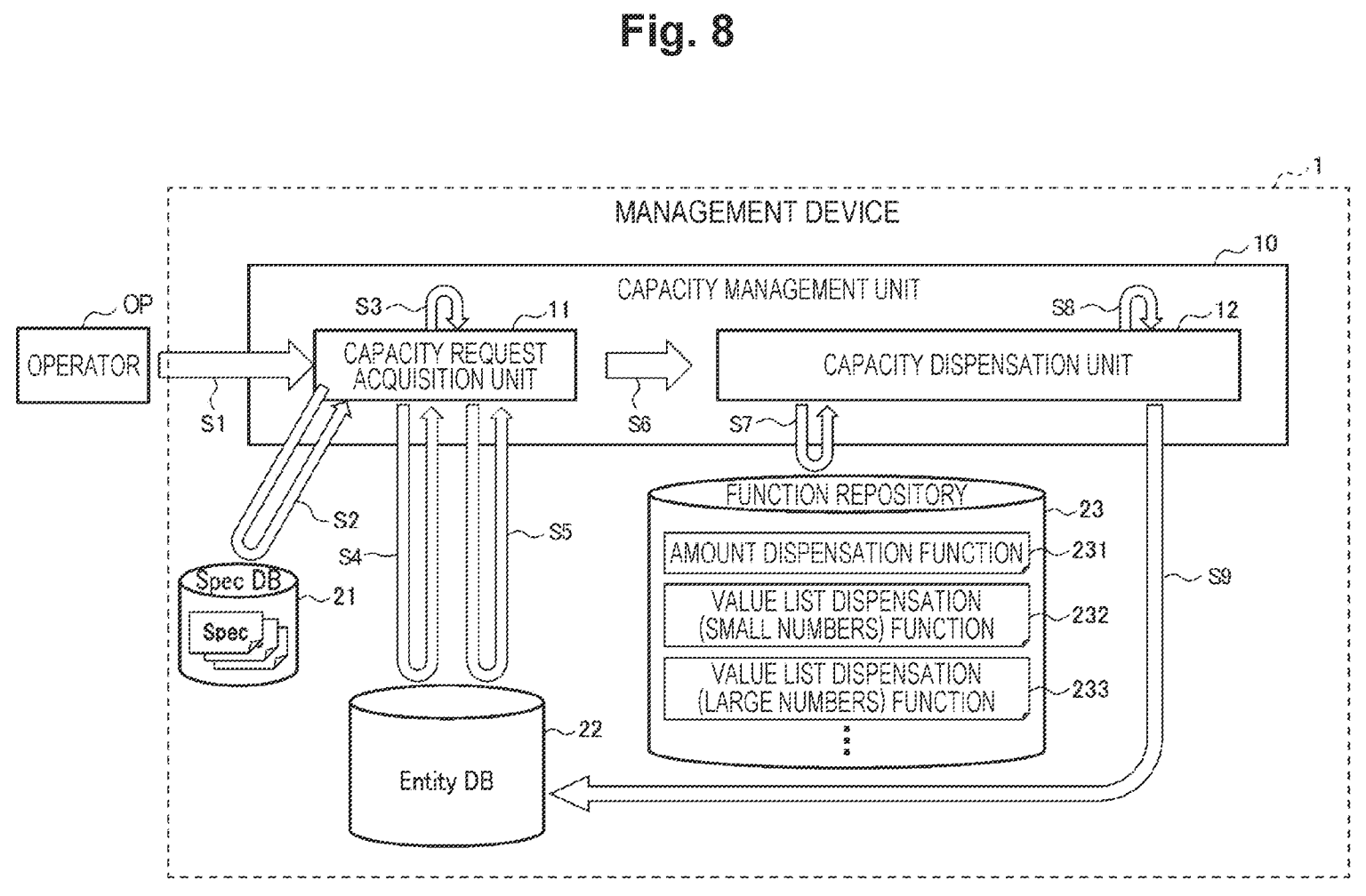

MANAGEMENT DEVICE
1
10
CAPACITY MANAGEMENT UNIT
11
CAPACITY REQUEST ACQUISITION UNIT
12
CAPACITY DISPENSATION UNIT
OPERATOR
OP
S1
S2
S3
S4
S5
S6
S7
S8
S9
21
Spec DB
Spec
22
Entity DB
23
FUNCTION REPOSITORY
231
AMOUNT DISPENSATION FUNCTION
232
VALUE LIST DISPENSATION (SMALL NUMBERS) FUNCTION
233
VALUE LIST DISPENSATION (LARGE NUMBERS) FUNCTION

| ATTRIBUTE NAME | MEANING | DATA EXAMPLE 1 | | DATA EXAMPLE 2 | |
|---|---|---|---|---|---|
| Name | NAME OF ENTITY | Switch1 ~ Switch2_FRE_UserA | | Switch1 ~ Switch2_FRE_UserB | |
| RSC | NAME OF ATTRIBUTE FOR WHICH CAPACITY IS REQUESTED | BAND | VLAN-ID | BAND | VLAN-ID |
| RCV | VALUE/AMOUNT CORRESPONDING TO CAPACITY ATTRIBUTE NAME | 60 | 1 | 30 | 2 |

| | MEANING | DATA EXAMPLE | | | |
|---|---|---|---|---|---|
| name | NAME OF ENTITY | Switch1 ~ Switch2_PL | | | |
| capacity | · INDICATING RECORD OF AVAILABLE CAPACITIES, AND CAPACITY ALREADY PROVIDED TO REQUESTOR ENTITY.<br>· ONE ENTITY CAN HOLD PLURALITY OF CAPACITY REQUESTS. | | | | |
| name | NAME OF CAPACITY TO BE PROVIDED | BAND | | VLAN-ID | |
| units | UNIT OF CAPACITIES TO BE PROVIDED (NOT APPLICABLE IN CASE OF VALUE LIST. DENOTED BY "-") | Mbps | | - | |
| capacityAmount | INDICATING RANGE OF AVAILABLE AMOUNTS OR VALUES | 100 | | 1~4094 | |
| capacityDemand | INDICATING ALREADY PROVIDED CAPACITY.<br>PLURALITY OF CAPACITIES CAN BE SET HEREIN. | | | | |
| capacityDemandAmount | AMOUNT OR VALUE OF ALREADY PROVIDED CAPACITY | 60 | 30 | 1 | 2 |
| entityName | NAME OF ENTITY AS DESTINATION OF PROVISION | Switch1 ~ Switch2_FRE_UserA | Switch1 ~ Switch2_FRE_UserB | Switch1 ~ Switch2_FRE_UserA | Switch1 ~ Switch2_FRE_UserB |

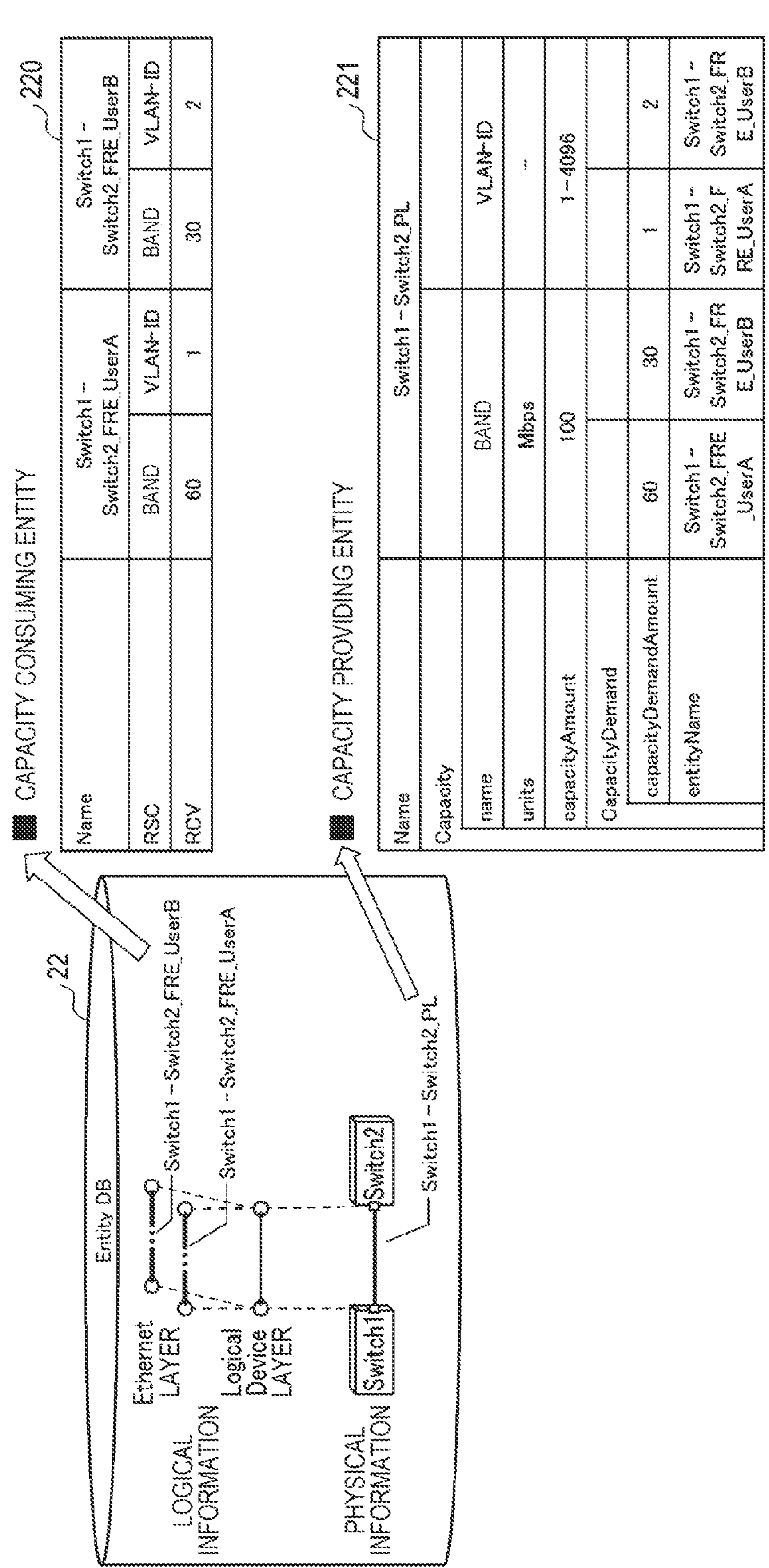
| Name | Switch1 ~ Switch2_FRE_UserA | | Switch1 ~ Switch2_FRE_UserB | |
|---|---|---|---|---|
| RSC | BAND | VLAN-ID | BAND | VLAN-ID |
| RCV | 60 | 1 | 30 | 2 |
| Name | Switch1 ~ Switch2_PL | | | |
|---|---|---|---|---|
| Capacity | | | | |
| name | BAND | | VLAN-ID | |
| units | Mbps | | -- | |
| capacityAmount | 100 | | 1 ~ 4096 | |
| CapacityDemand | | | | |
| capacityDemandAmount | 60 | 30 | 1 | 2 |
| entityName | Switch1 ~ Switch2_FRE_UserA | Switch1 ~ Switch2_FRE_UserB | Switch1 ~ Switch2_FRE_UserA | Switch1 ~ Switch2_FRE_UserB |

Fig. 16

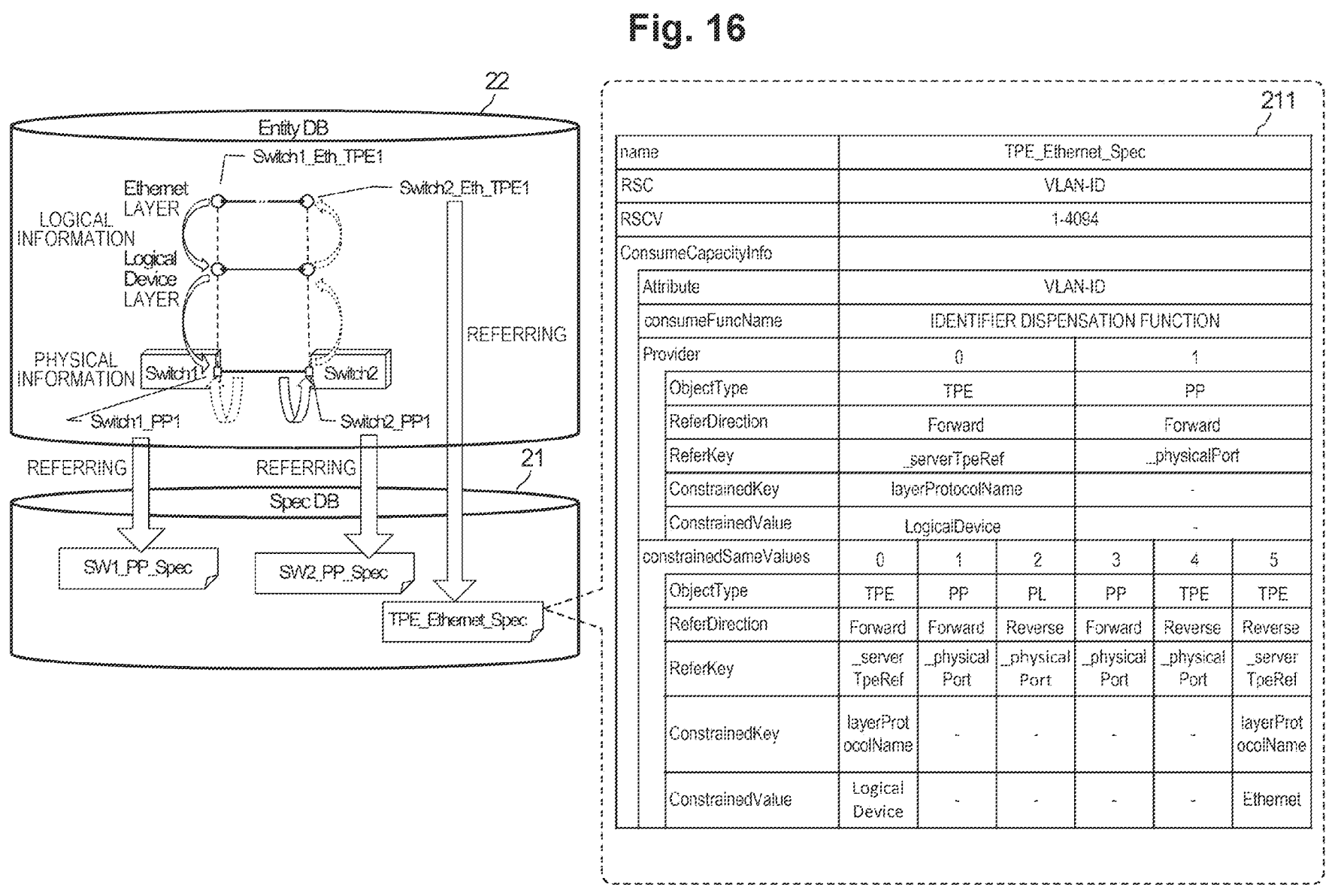

22
Entity DB
Switch1_Eth_TPE1
Switch2_Eth_TPE1
LOGICAL INFORMATION
Ethernet LAYER
Logical Device LAYER
PHYSICAL INFORMATION
Switch1
Switch2
Switch1_PP1
Switch2_PP1
REFERRING
REFERRING
REFERRING
21
Spec DB
SW1_PP_Spec
SW2_PP_Spec
TPE_Ethernet_Spec

211

| name | TPE_Ethernet_Spec | | | | | |
|---|---|---|---|---|---|---|
| RSC | VLAN-ID | | | | | |
| RSCV | 1-4094 | | | | | |
| ConsumeCapacityInfo | | | | | | |
| Attribute | VLAN-ID | | | | | |
| consumeFuncName | IDENTIFIER DISPENSATION FUNCTION | | | | | |
| Provider | 0 | | | 1 | | |
| ObjectType | TPE | | | PP | | |
| ReferDirection | Forward | | | Forward | | |
| ReferKey | _serverTpeRef | | | _physicalPort | | |
| ConstrainedKey | layerProtocolName | | | - | | |
| ConstrainedValue | LogicalDevice | | | - | | |
| constrainedSameValues | 0 | 1 | 2 | 3 | 4 | 5 |
| ObjectType | TPE | PP | PL | PP | TPE | TPE |
| ReferDirection | Forward | Forward | Reverse | Forward | Reverse | Reverse |
| ReferKey | _server TpeRef | _physical Port | _physical Port | _physical Port | _physical Port | _server TpeRef |
| ConstrainedKey | layerProt ocolName | - | - | - | - | layerProt ocolName |
| ConstrainedValue | Logical Device | - | - | - | - | Ethernet |

| | MEANING | DATA EXAMPLE | |
|---|---|---|---|
| name | NAME OF Spec | FRE_VLAN_Spec | |
| RSC | ATTRIBUTE NAME INDICATING CHARACTERISTICS OF NETWORK OR ICT DEVICE | BAND | |
| RSOV | RANGE OF POSSIBLE VALUES OF ABOVE ATTRIBUTE | 1～1000Mbps | |
| ConsumeCapacityInfo | INDICATING INFORMATION REGARDING CAPACITY CONSUMPTION. | | |
| Attribute | NAME OF ATTRIBUTE FOR WHICH CAPACITY IS REQUESTED, WHICH NEEDS TO BE DEFINED IN RSC. | BAND | |
| consumeFuncName | INDICATING NAME OF FUNCTION TO BE USED IN CAPACITY DISPENSATION. | IDENTIFIER DISPENSATION FUNCTION | |
| Provider | INFORMATION FOR IDENTIFYING CAPACITY PROVIDING ENTITY IS SHOWN IN ARRAY<br>REFERENCE RELATIONSHIP BETWEEN ENTITIES IS TRACED IN ORDER OF ARRAY STARTING FROM CAPACITY CONSUMING ENTITY, AND END OF ARRAY POINTS TO CAPACITY PROVIDING ENTITY. | 0 | 1 |
| ObjectType | INDICATING TYPE OF ENTITY TO BE REFERRED TO.<br>(PD, PP, PL, TL, NFD, TPE, FRE(NC), FRE(LC), OR FRE(XC)) | TPE | PP |
| ReferDirection | INDICATING DIRECTION OF REFERENCE.<br>Forward: FORWARD DIRECTION, Reverse: REVERSE DIRECTION. | Forward | Forward |
| ReferKey | INDICATING ATTRIBUTE NAME THAT SERVES AS KEY IN NEXT ENTITY REFERENCE. | _serverTpeRef | _physicalPort |
| ConstrainedKey | INDICATING KEY INFORMATION FOR NARROWING DOWN PLURALITY OF REFERENCE DESTINATION CANDIDATES IN CONJUNCTION WITH CONSTRAINT CONDITION. | layerProtocolName | - |
| ConstrainedValue | INDICATING VALUE CORRESPONDING TO ABOVE KEY. | LogicalDevice | - |

ARRAY FORMAT

Provider

Index: 0
ObjectType: TPE
ReferDirection: Forward
ReferKey: _serverTpeRef

Index: 1
ObjectType: TPE
ReferDirection: Forward
ReferKey: _physicalPort

Fig. 17B

| Item | Description | | | | | | |
|---|---|---|---|---|---|---|---|
| constrainedSameValues | CONSTRAINT CONDITION (CALLED EQUIVALENCE CONSTRAINT) FOR GROUPING CAPACITY CONSUMPTION RESOURCES TO DISPENSE SAME VALUE IN COOPERATION FROM CAPACITIES OF PLURALITY OF DEVICE RESOURCES IS SHOWN IN ARRAY. REFERENCE RELATIONSHIP BETWEEN ENTITIES IS TRACED IN ORDER OF ARRAY STARTING FROM CAPACITY CONSUMING ENTITY, AND LAST ENTITY GROUP(S) IN ARRAY IS GROUPED. | 0 | 1 | 2 | 3 | 4 | 5 |
| ObjectType | INDICATING TYPE OF ENTITY TO BE REFERRED TO. (PD, PP, PL, TL, NFD, TPE, FRE(NC), FRE(LC), OR FRE(XC)) | TPE | PP | PL | PP | TPE | TPE |
| ReferDirection | INDICATING DIRECTION OF REFERENCE. Forward: FORWARD DIRECTION, Reverse: REVERSE DIRECTION. | Forward | Forward | Forward | Forward | Reverse | Reverse |
| ReferKey | INDICATING ATTRIBUTE NAME THAT SERVES AS KEY IN NEXT ENTITY REFERENCE. | _serverTpeRef | _physicalPort | _physicalPort | _physicalPort | _physicalPort | _serverTpeRef |
| ConstrainedKey | INDICATING KEY INFORMATION FOR NARROWING DOWN PLURALITY OF REFERENCE DESTINATION CANDIDATES IN CONJUNCTION WITH CONSTRAINT CONDITION. | layerProtocolName | - | - | - | - | layerProtocolName |
| ConstrainedValue | INDICATING VALUE CORRESPONDING TO ABOVE KEY. | Logical Device | - | - | - | - | Ethernet |

ARRAY FORMAT constrained SameValues

Index: 0
ObjectType: TPE
ReferDirection: Forward
ReferKey: _serverTpeRef

Index: 1
ObjectType: PP
ReferDirection: Forward
ReferKey: _physicalPort

Figure 18:
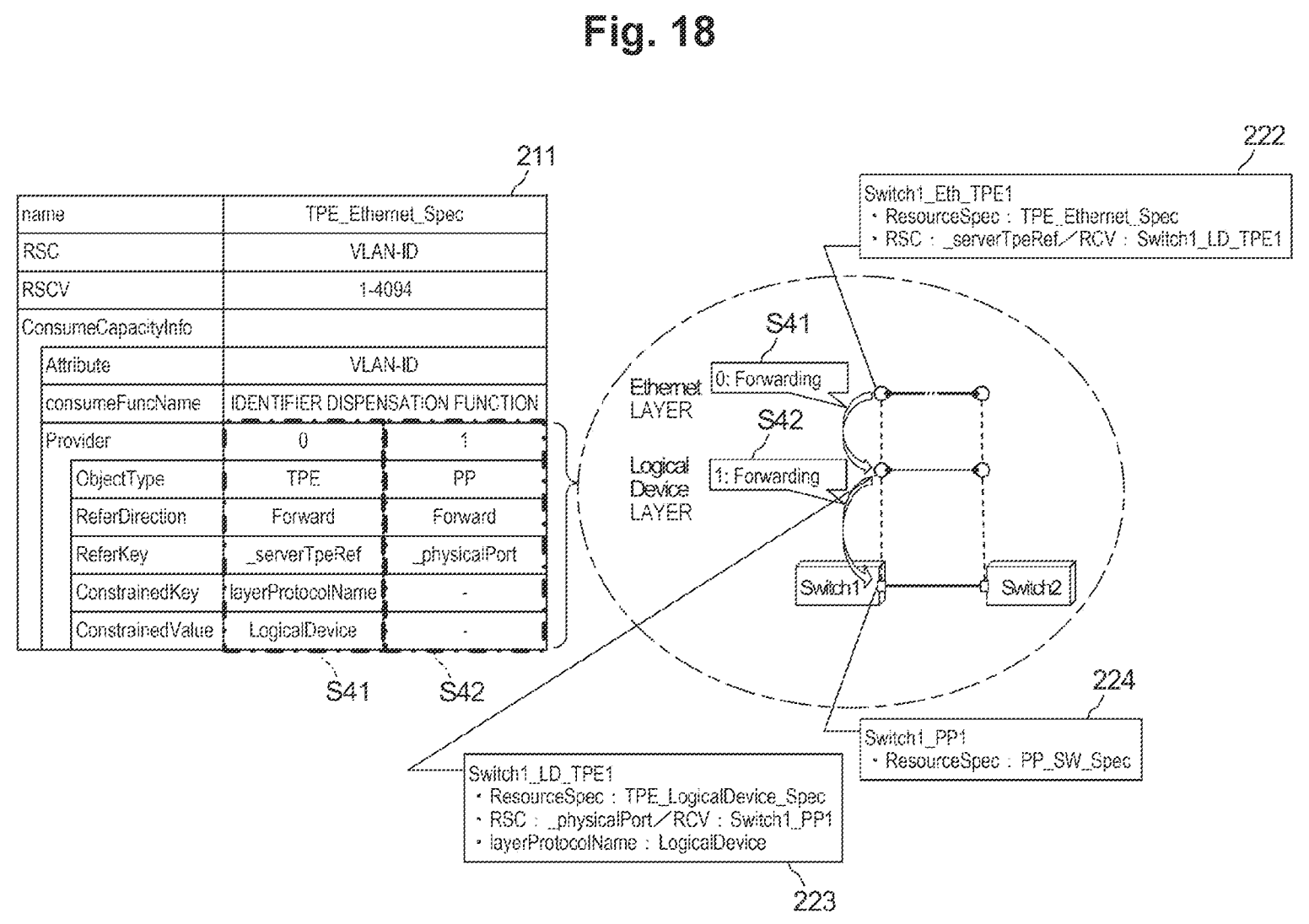

| name | TPE_Ethernet_Spec | |
|---|---|---|
| RSC | VLAN-ID | |
| RSCV | 1-4094 | |
| ConsumeCapacityInfo | | |
| Attribute | VLAN-ID | |
| consumeFuncName | IDENTIFIER DISPENSATION FUNCTION | |
| Provider | 0 | 1 |
| ObjectType | TPE | PP |
| ReferDirection | Forward | Forward |
| ReferKey | _serverTpeRef | _physicalPort |
| ConstrainedKey | layerProtocolName | - |
| ConstrainedValue | LogicalDevice | - |

S41 S42

222
Switch1_Eth_TPE1
・ResourceSpec : TPE_Ethernet_Spec
・RSC : _serverTpeRef／RCV : Switch1_LD_TPE1

Ethernet LAYER
S41
0: Forwarding
Logical Device LAYER
S42
1: Forwarding
Switch1
Switch2

224
Switch1_PP1
・ResourceSpec : PP_SW_Spec

223
Switch1_LD_TPE1
・ResourceSpec : TPE_LogicalDevice_Spec
・RSC : _physicalPort／RCV : Switch1_PP1
・layerProtocolName : LogicalDevice

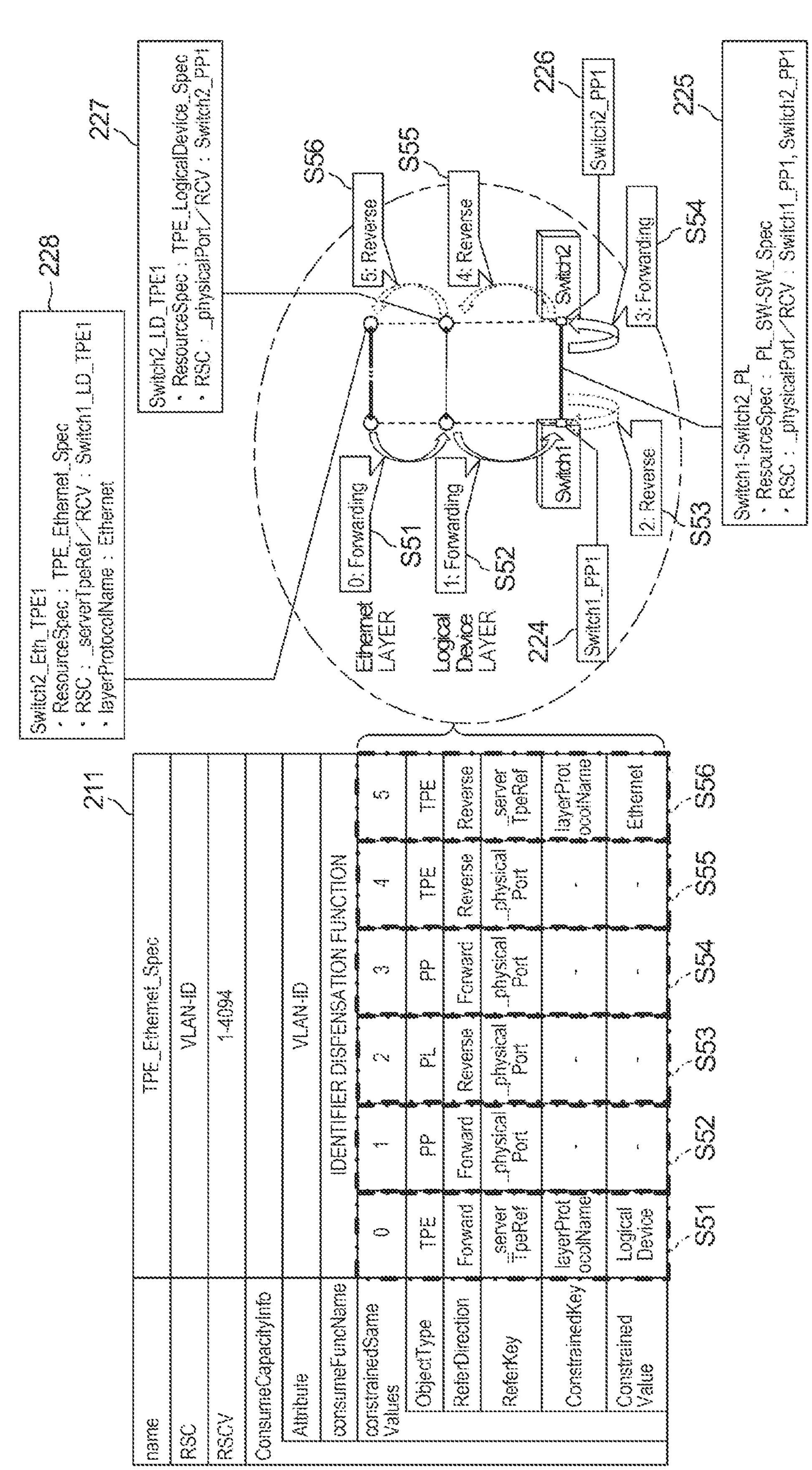
Fig. 19
211
name
TPE_Ethernet_Spec
RSC
VLAN-ID
RSCV
1-4094
ConsumeCapacityInfo
Attribute
VLAN-ID
consumeFuncName
IDENTIFIER DISPENSATION FUNCTION
constrainedSame Values
0
1
2
3
4
5
ObjectType
TPE
PP
PL
PP
TPE
TPE
ReferDirection
Forward
Forward
Reverse
Forward
Reverse
Reverse
ReferKey
_server TpeRef
_physical Port
_physical Port
_physical Port
_physical Port
_server TpeRef
ConstrainedKey
layerProt ocolName
-
-
-
-
layerProt ocolName
Constrained Value
Logical Device
-
-
-
-
Ethernet
S51
S52
S53
S54
S55
S56
228
Switch2_Eth_TPE1
・ResourceSpec : TPE_Ethernet_Spec
・RSC : _serverTpeRef/RCV : Switch1_LD_TPE1
・layerProtocolName : Ethernet
227
Switch2_LD_TPE1
・ResourceSpec : TPE_LogicalDevice_Spec
・RSC : _physicalPort/RCV : Switch2_PP1
Ethernet LAYER
Logical Device LAYER
0: Forwarding
1: Forwarding
2: Reverse
3: Forwarding
4: Reverse
5: Reverse
Switch1
Switch2
224
Switch1_PP1
226
Switch2_PP1
225
Switch1-Switch2_PL
・ResourceSpec : PL_SW-SW_Spec
・RSC : _physicalPort/RCV : Switch1_PP1, Switch2_PP1

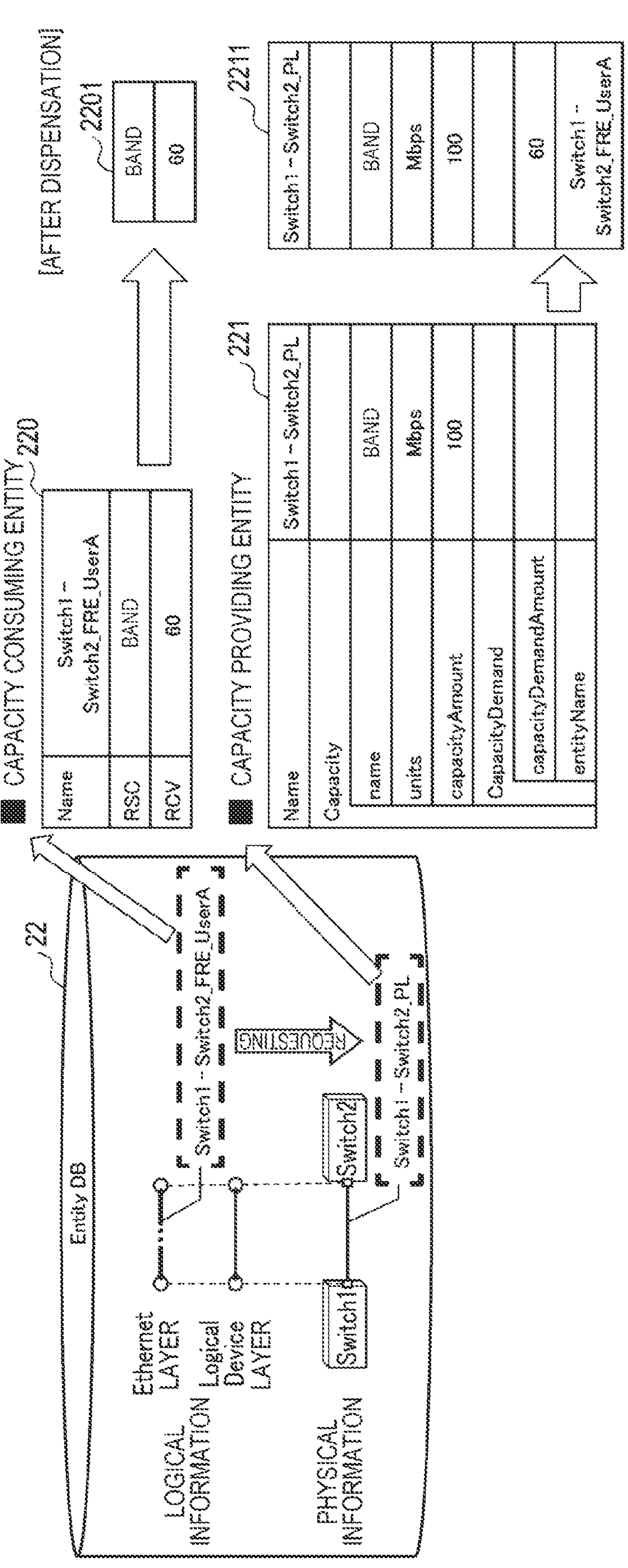
Fig. 20
22
Entity DB
LOGICAL INFORMATION
Ethernet LAYER
Logical Device LAYER
PHYSICAL INFORMATION
Switch1
Switch2
Switch1 ~ Switch2_FRE_UserA
Switch1 ~ Switch2_PL
REQUESTING
CAPACITY CONSUMING ENTITY
220
Name
Switch1 ~ Switch2_FRE_UserA
RSC
BAND
RCV
60
[AFTER DISPENSATION]
2201
BAND
60
CAPACITY PROVIDING ENTITY
221
Name
Switch1 ~ Switch2_PL
Capacity
name
BAND
units
Mbps
capacityAmount
100
CapacityDemand
capacityDemandAmount
entityName
2211
Switch1 ~ Switch2_PL
BAND
Mbps
100
60
Switch1 ~ Switch2_FRE_UserA

Fig. 22

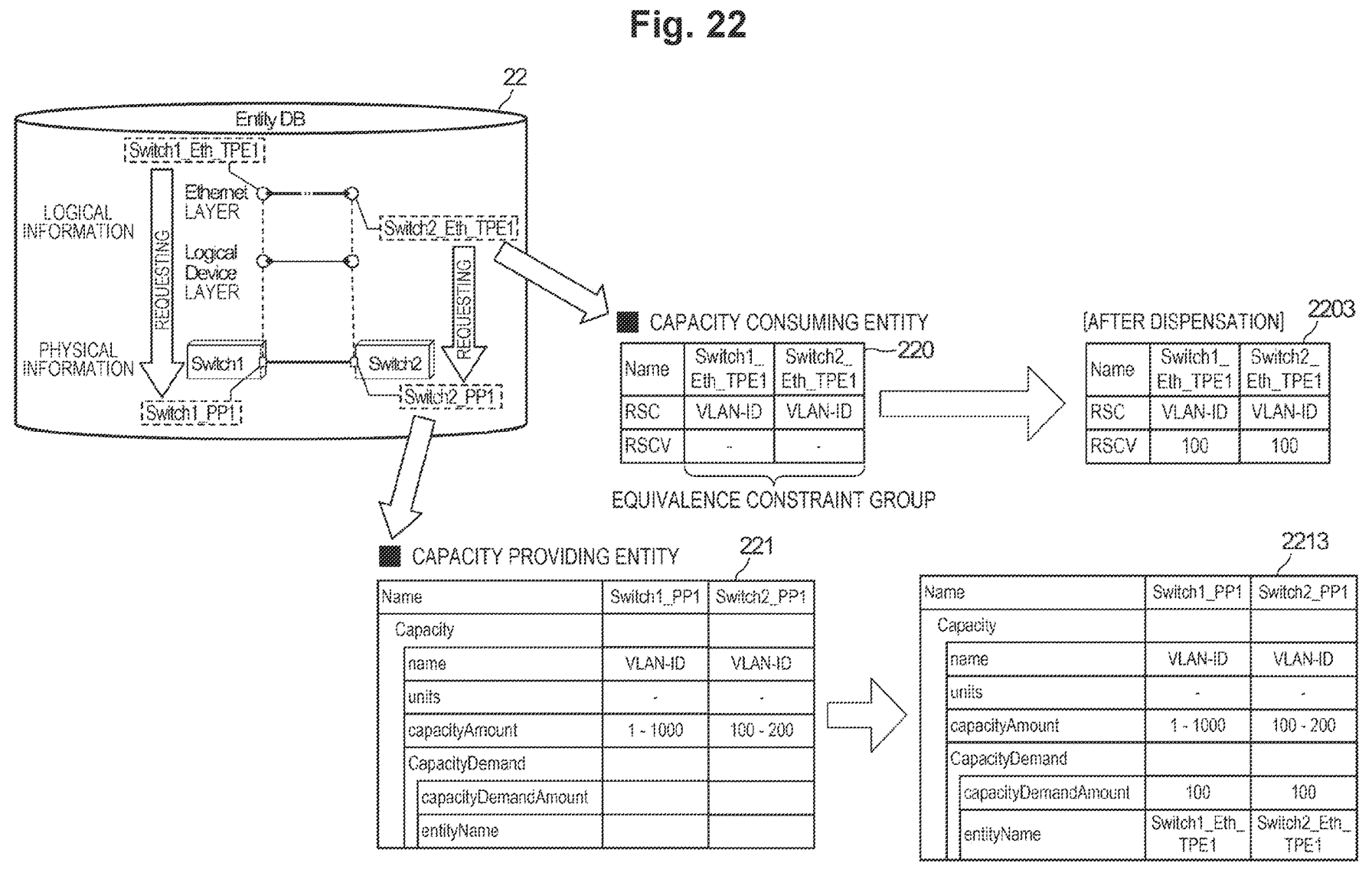

■ CAPACITY CONSUMING ENTITY

220

| Name | Switch1_Eth_TPE1 | Switch2_Eth_TPE1 |
|---|---|---|
| RSC | VLAN-ID | VLAN-ID |
| RSCV | - | - |

EQUIVALENCE CONSTRAINT GROUP

[AFTER DISPENSATION]

2203

| Name | Switch1_Eth_TPE1 | Switch2_Eth_TPE1 |
|---|---|---|
| RSC | VLAN-ID | VLAN-ID |
| RSCV | 100 | 100 |

■ CAPACITY PROVIDING ENTITY

221

| Name | Switch1_PP1 | Switch2_PP1 |
|---|---|---|
| Capacity | | |
| name | VLAN-ID | VLAN-ID |
| units | - | - |
| capacityAmount | 1 - 1000 | 100 - 200 |
| CapacityDemand | | |
| capacityDemandAmount | | |
| entityName | | |

2213

| Name | Switch1_PP1 | Switch2_PP1 |
|---|---|---|
| Capacity | | |
| name | VLAN-ID | VLAN-ID |
| units | - | - |
| capacityAmount | 1 - 1000 | 100 - 200 |
| CapacityDemand | | |
| capacityDemandAmount | 100 | 100 |
| entityName | Switch1_Eth_TPE1 | Switch2_Eth_TPE1 |

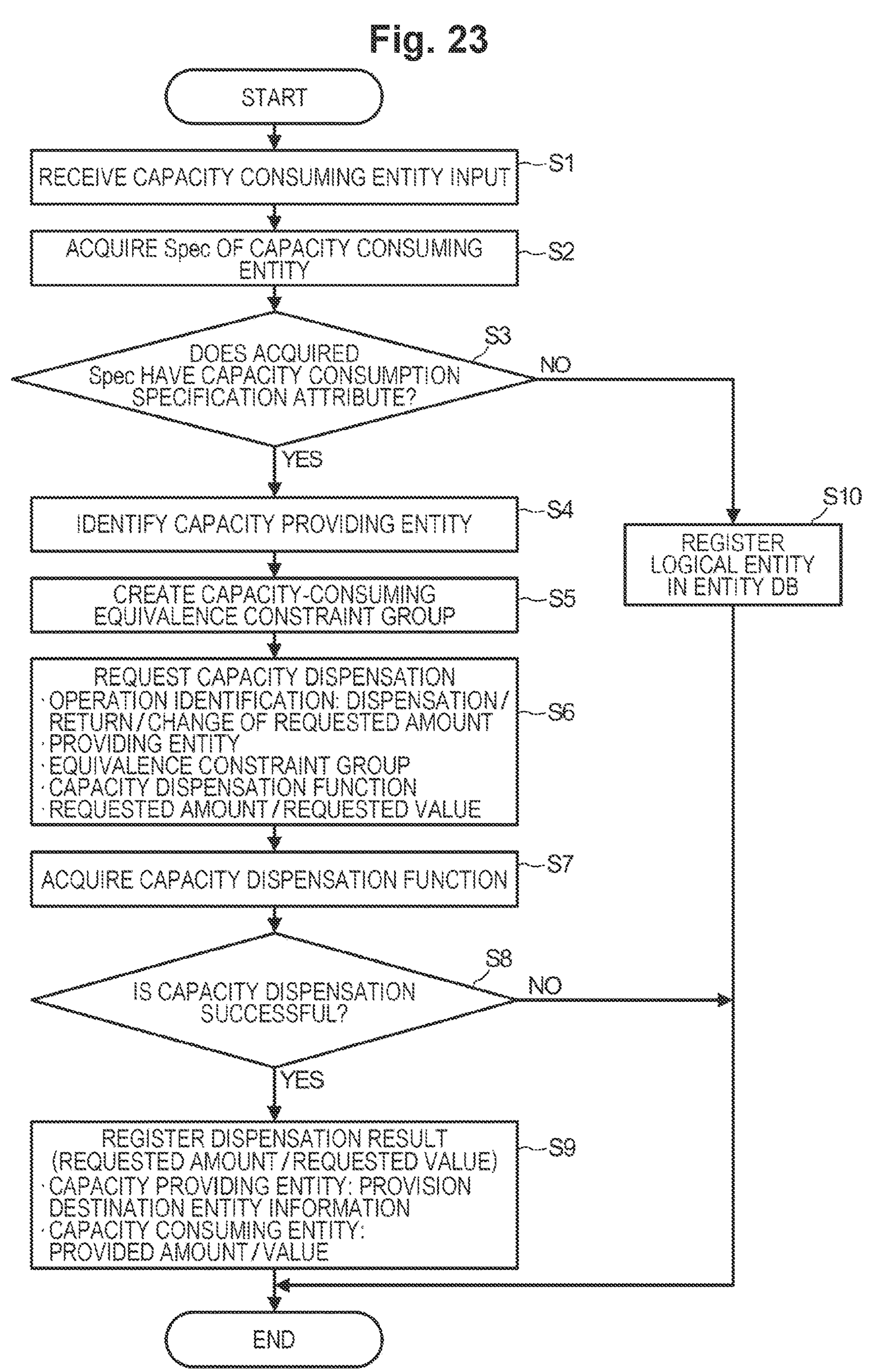
Fig. 23
START
RECEIVE CAPACITY CONSUMING ENTITY INPUT
S1
ACQUIRE Spec OF CAPACITY CONSUMING ENTITY
S2
DOES ACQUIRED Spec HAVE CAPACITY CONSUMPTION SPECIFICATION ATTRIBUTE?
S3
NO
YES
IDENTIFY CAPACITY PROVIDING ENTITY
S4
CREATE CAPACITY-CONSUMING EQUIVALENCE CONSTRAINT GROUP
S5
REQUEST CAPACITY DISPENSATION
· OPERATION IDENTIFICATION: DISPENSATION / RETURN / CHANGE OF REQUESTED AMOUNT
· PROVIDING ENTITY
· EQUIVALENCE CONSTRAINT GROUP
· CAPACITY DISPENSATION FUNCTION
· REQUESTED AMOUNT / REQUESTED VALUE
S6
ACQUIRE CAPACITY DISPENSATION FUNCTION
S7
IS CAPACITY DISPENSATION SUCCESSFUL?
S8
NO
YES
REGISTER DISPENSATION RESULT (REQUESTED AMOUNT / REQUESTED VALUE)
· CAPACITY PROVIDING ENTITY: PROVISION DESTINATION ENTITY INFORMATION
· CAPACITY CONSUMING ENTITY: PROVIDED AMOUNT / VALUE
S9
S10
REGISTER LOGICAL ENTITY IN ENTITY DB
END

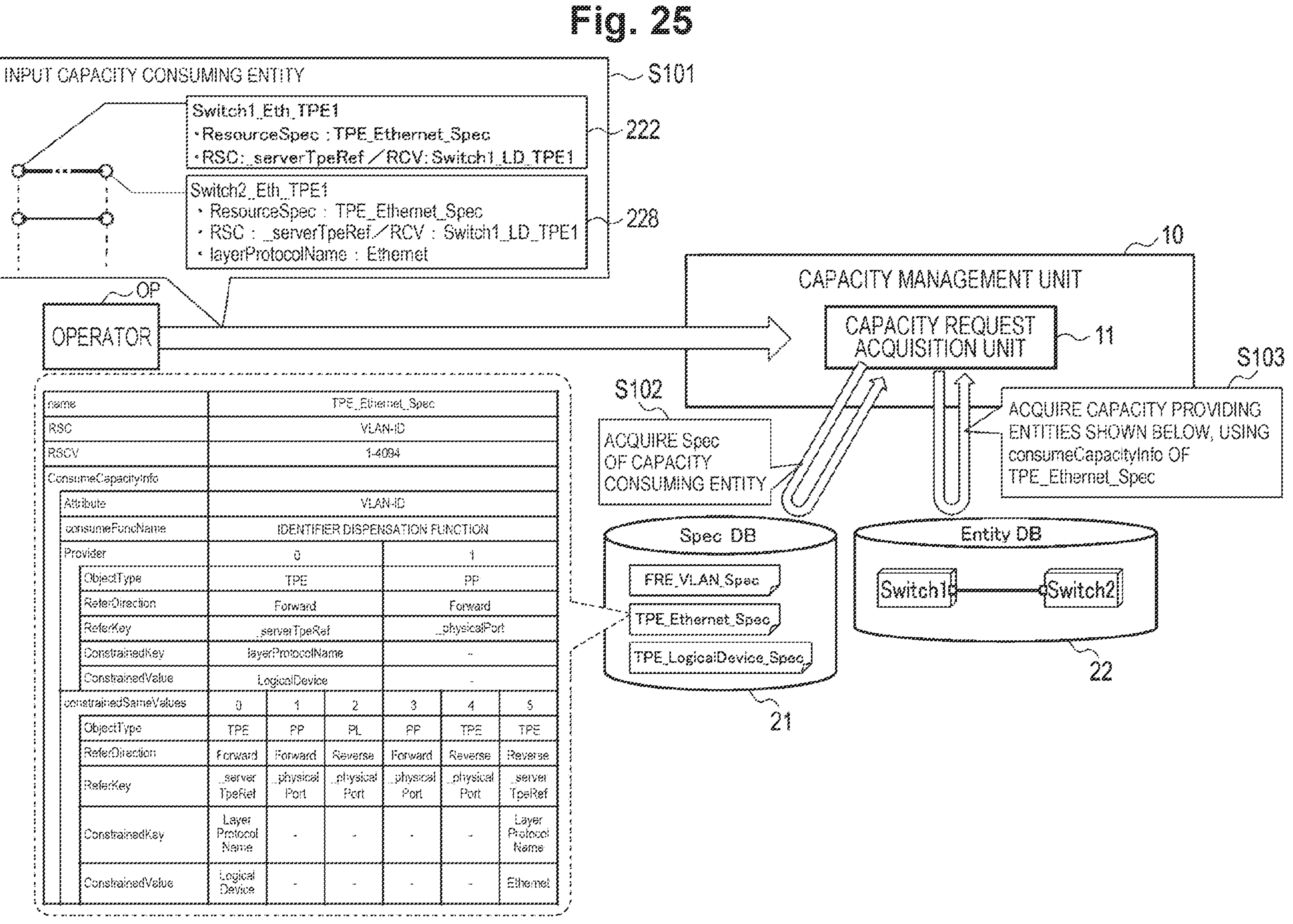

| name | TPE_Ethernet_Spec | | | | | |
|---|---|---|---|---|---|---|
| RSC | VLAN-ID | | | | | |
| RSCV | 1-4094 | | | | | |
| ConsumeCapacityInfo | | | | | | |
| Attribute | VLAN-ID | | | | | |
| consumeFuncName | IDENTIFIER DISPENSATION FUNCTION | | | | | |
| Provider | 0 | | | 1 | | |
| ObjectType | TPE | | | PP | | |
| ReferDirection | Forward | | | Forward | | |
| ReferKey | _serverTpeRef | | | _physicalPort | | |
| ConstrainedKey | layerProtocolName | | | - | | |
| ConstrainedValue | LogicalDevice | | | - | | |
| constrainedSameValues | 0 | 1 | 2 | 3 | 4 | 5 |
| ObjectType | TPE | PP | PL | PP | TPE | TPE |
| ReferDirection | Forward | Forward | Reverse | Forward | Reverse | Reverse |
| ReferKey | _server TpeRef | _physical Port | _physical Port | _physical Port | _physical Port | _server TpeRef |
| ConstrainedKey | Layer Protocol Name | - | - | - | - | Layer Protocol Name |
| ConstrainedValue | Logical Device | - | - | - | - | Ethernet |

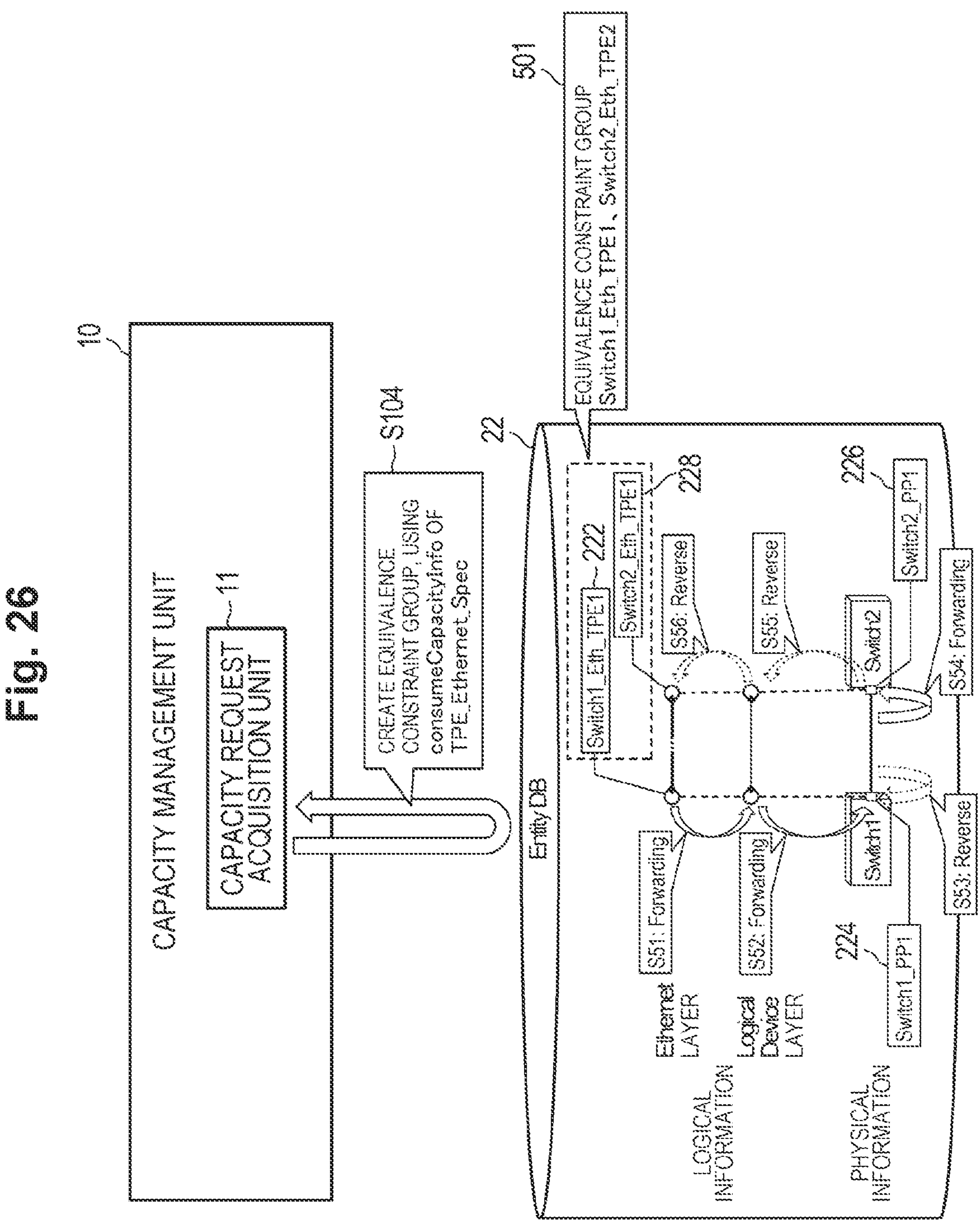
Fig. 26
10
CAPACITY MANAGEMENT UNIT
11
CAPACITY REQUEST ACQUISITION UNIT
S104
CREATE EQUIVALENCE CONSTRAINT GROUP, USING consumeCapacityInfo OF TPE_Ethernet_Spec
22
Entity DB
501
EQUIVALENCE CONSTRAINT GROUP
Switch1_Eth_TPE1, Switch2_Eth_TPE2
228
222
Switch1_Eth_TPE1
Switch2_Eth_TPE1
S56: Reverse
S55: Reverse
226
Switch2_PP1
Switch2
S54: Forwarding
S51: Forwarding
S52: Forwarding
Switch1
S53: Reverse
224
Switch1_PP1
Ethernet LAYER
Logical Device LAYER
LOGICAL INFORMATION
PHYSICAL INFORMATION

MANAGEMENT APPARATUS, MANAGEMENT METHOD AND MANAGEMENT PROGRAM

CROSS-REFERENCE TO RELATED APPLICATIONS

This application is a National Stage application under 35 U.S.C. § 371 of International Application No. PCT/JP2021/018403, having an International Filing Date of May 14, 2021.

The disclosure of the prior application is considered part of the disclosure of this application, and is incorporated by reference in its entirety into this application.

TECHNICAL FIELD

One mode of this invention relates to a management device, a management method, and a management program.

BACKGROUND ART

There are known network and ICT operation services for managing a network (NW) including network devices, and information and communication technology (ICT) devices such as a server, and configuring the settings for the network and the ICT devices in response to an order from a user. In such a network and ICT operation service, a network and ICT management system is used to automate the complicated settings for a plurality of devices. The network and ICT management system has a network and ICT information management function that holds management information in accordance with the network and ICT devices to be managed.

Normally, the network and ICT management system has a management function specialized for a specific network and ICT devices. Therefore, it is necessary to redevelop the network and ICT management system each time a change is made to an environment such as the model of the network devices constituting the network, the model of the ICT devices, the network scheme, the connection scheme, or the communication scheme.

To counter this, there is a suggested system architecture in which the network and ICT management system does not need to be redeveloped for each network to be managed or each ICT device to be managed, in a case where the model of the network or ICT devices to be managed, or the communication scheme is changed (see Non Patent Literature 1, for example). That is, Non Patent Literature 1 suggests a mechanism that enables general-purpose data retention that does not depend on the network or ICT device to be managed.

Further, in a network and ICT operation service, settings are configured for devices so as to enable communication based on the user's request. In this configuration, it is not possible to configure a setting that exceeds resources such as the communication band that can be provided by the devices. Therefore, it is necessary to manage the capacities of the resources that can be provided by the devices, and configure settings for the devices while determining whether allocation to the user is possible. In view of this, Non Patent Literature 2 suggests a mechanism for managing the capacities of the resources of the devices and automatically allocating necessary resources, in addition to the general-purpose data management mechanism disclosed in Non Patent Literature 1.

CITATION LIST

Non Patent Literature

Non Patent Literature 1: Masataka Sato and three others, "Study of Variable Management Architecture for Diverse Networks", IEICE Technical Report, vol. 116 (no. 324), pp. 37-42, Nov. 24, 2016

Non Patent Literature 2: Masataka Sato, Shingo Horiuchi, "Flexible Network Resource-Allocation Architecture Using Specification Injection", Proceedings of the 20th Asia-Pacific Network Operations and Management Symposium (APNOMS 2019)

SUMMARY OF INVENTION

Technical Problem

In a network and ICT operation service, it is necessary to cooperatively allocate a plurality of resources of the network and the ICT devices, in response to the user's request.

By the technology suggested in Non Patent Literature 2, it is possible to automatically manage the capacities of device resources. However, the resource capacity management and allocation is performed for a single device, and therefore, resources of a plurality of devices cannot be cooperatively allocated.

This invention has been made in view of the above circumstances, and aims to provide a technology for cooperatively managing a plurality of resource capacities, and automatically allocating the necessary resources in a network and ICT management system that does not depend on the network and ICT devices to be managed.

Solution to Problem

To solve the above problem, a mode of this invention is a management device that includes a hardware processor and a memory. The memory includes: a first storage unit that stores specification information indicating specifications of a plurality of entities including a network and an ICT device that are to be managed; and a second storage unit that stores entity information including information indicating a relationship between the plurality of entities. The hardware processor is designed to: receive an entity generation request that requests generation of a first entity with respect to the network or the ICT device; read the specification information regarding the first entity from the first storage unit, to determine whether the first entity has a consumption specification attribute indicating a need of consumption of a resource in the network or of the ICT device; when the first entity is determined to have the consumption specification attribute, identify a second entity capable of providing a capacity of a resource to be consumed by the first entity, on the basis of the entity information stored in the second storage unit; determine, on the basis of the identified second entity, whether dispensation of the capacity of the resource to be consumed by the first entity is possible; and, when the dispensation is determined to be possible, dispense the capacity to the first entity. When a plurality of the entity generation requests is received, the hardware processor dispenses a capacity of a common resource to a plurality of the first entities requested through the plurality of the entity generation requests, on the basis of the second entity identified for each first entity of the plurality of the first entities.

Advantageous Effects of Invention

According to one mode of this invention, in a network and ICT management system that does not depend on the network and ICT devices to be managed, a plurality of resource capacities can be cooperatively managed, and necessary resources can be automatically allocated.

BRIEF DESCRIPTION OF DRAWINGS

FIG. 1 is a block diagram illustrating the functional configuration of a management device according to an embodiment of this invention.

FIG. 2 is a diagram illustrating an example of the entities that are managed by the management device illustrated in FIG. 1.

FIG. 8 is a diagram illustrating the procedures of capacity management in a process to be performed by the management device illustrated in FIG. 1.

FIG. 13 is a diagram illustrating an example of definitions of attributes of a capacity consuming entity in the management device illustrated in FIG. 1.

FIG. 14 is a diagram illustrating an example of definitions of attributes of a capacity providing entity in the management device illustrated in FIG. 1.

FIG. 15 is a diagram illustrating an example of capacity retention in the management device illustrated in FIG. 1.

FIG. 16 is a diagram illustrating an example of the specification of a capacity consuming entity in the management device illustrated in FIG. 1.

FIG. 17A is a diagram illustrating an example of definitions in the specification illustrated in FIG. 16.

FIG. 17B is a diagram illustrating an example of definitions in the specification illustrated in FIG. 16.

FIG. 18 is a diagram illustrating a flow of a capacity providing entity search based on the specification illustrated in FIG. 16.

FIG. 19 is a diagram illustrating a flow of grouping by an equivalence constraint based on the specification illustrated in FIG. 16.

FIG. 20 is a diagram illustrating a first example of capacity dispensation in the management device illustrated in FIG. 1.

FIG. 22 is a diagram illustrating a third example of capacity dispensation in the management device illustrated in FIG. 1.

FIG. 23 is a flowchart illustrating the processing procedures and the processing details to be performed by the management device illustrated in FIG. 1.

FIG. 25 is a diagram illustrating an example of the processing procedures to be carried out by a capacity request acquisition unit of the management device illustrated in FIG. 1.

FIG. 26 is a diagram illustrating an example of the equivalence constraint group creating procedures to be carried out by the capacity request acquisition unit of the management device illustrated in FIG. 1.

DESCRIPTION OF EMBODIMENTS

Figure 3:
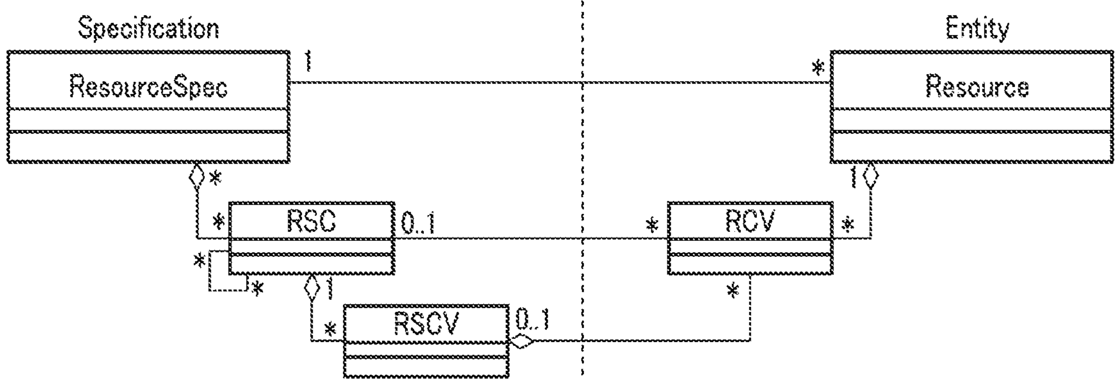
FIG. 3 is a diagram illustrating the relationship between specifications and entities that are used in the management device illustrated in FIG. 1.

The following is a description of embodiments according to this invention, with reference to the drawings.

Embodiment

<1> Configuration

<1-1> Functional Configuration

A management device according to an embodiment manages a network including a plurality of network devices and ICT devices such as a server, a personal computer (PC), and a terminal connected to the network, and automatically allocates resources that satisfy requests from users. The management device is formed with a server computer that is managed by a telecommunications carrier, for example.

FIG. 1 is a block diagram illustrating the functional configuration of such a management device 1.

The management device 1 can communicate with a plurality of network devices (not illustrated in FIG. 1) constituting a network (NW) 2, and can also communicate with a plurality of ICT devices 3 connected to the network 2. The network 2 is used to provide network services, for example, and can include an Internet Protocol (IP) network that is typically the Internet, and a plurality of access networks for accessing the IP network. As the access networks, a wireless local area network (LAN), a mobile telephone network, a wired telephone network, a fiber to the home (FTTH), or a cable television (CATV) network is used, for example. Hereinafter, the management device 1, the network 2, and the ICT devices 3 will be also collectively referred to as the "network and ICT management system".

The management device 1 illustrated in FIG. 1 includes a capacity management unit 10 as a processing functional unit by software, and also includes a management information database (DB) 20 in addition to a program storage unit as a storage area necessary for realizing this embodiment.

The capacity management unit 10 has a function of managing resource capacities of the network and the ICT devices 3 which are the management target devices, determining whether a user's request can be satisfied for the resource capacities, and paying out necessary resources in a case where it is determined that the user's request can be satisfied. The capacity management unit 10 includes a capacity request acquisition unit 11 and a capacity dispensation unit 12.

As a request acquisition unit, the capacity request acquisition unit 11 performs a process of receiving an input from an operator based on a user's request, acquiring the information necessary for dispensing the capacity corresponding to the user's request, generating a dispensation request, and delivering the dispensation request to the capacity dispensation unit 12.

The capacity dispensation unit 12 receives the capacity dispensation request from the capacity request acquisition unit 11, and performs a process of dispensing the capacity.

Here, the management device 1 according to the embodiment adopts a network and ICT management architecture that has a mechanism for externally defining attributes included in network and ICT management information (entity) with the specification that specifies the characteristics of the network or the ICT devices. Each piece of information is stored in the management information DB 20.

The management information DB 20 stores various kinds of information for managing the management target device, and includes a specification DB (Spec DB) 21 as a first storage unit, an entity DB (Entity DB) 22 as a second storage unit, and a function repository 23 as a third storage unit.

The specification DB 21 stores specification information that specifies the features of the network or the ICT devices. The specification information includes a specification related to entities, which are network and ICT management information.

The entity DB 22 stores attribute information regarding entities, which is network and ICT management information. The attribute information includes information indicating the relationship between entities and the characteristics (such as a virtual local area network (VLAN)) of each of the network 2 and the ICT devices 3 included in the entities.

The function repository 23 stores various kinds of functions to be used to dispense capacities. FIG. 1 shows an amount dispensation function 231, a value list dispensation (small numbers) function 232, and a value list dispensation (large numbers) function 233 as an example of the functions stored in the function repository 23, but functions are not limited to these functions.

FIG. 2 is a diagram illustrating an example of the entities that are managed by the management device 1 on the basis of the network and ICT management architecture. The entities are roughly divided into entities in a physical layer and entities in a logical layer. In the example illustrated in FIG. 2, a physical device (PD, a device), a physical port (PP, a communication port of a device), and a physical link (PL, a connection cable between devices) are defined as the entities in the physical layer. In the example illustrated in FIG. 2, a topological link (TL, connectivity between devices), a network forwarding domain (NFD, a forwardable range in a device), termination point encapsulation (TPE, a termination point of communication), forwarding relationship encapsulation (FRE), network connection (NC, end-end connectivity formed by LC and XC between TPE), link connect (LC, connectivity between devices terminated with TPE), and cross connect (XC, connectivity in a device terminated with TPE) are also defined as the entities in the logical layer. As illustrated in FIG. 2, the respective entities are also distinguished from one another with symbols shown in the drawing.

FIG. 3 is a diagram showing a class diagram illustrating the relationship between specifications and entities. In this architecture, the entities are collectively referred to as resources, and the specifications of the resources is referred to as ResourceSpecification (ResourceSpec). The ResourceSpec includes ResourceSpecCharacteristic (RSC) and ResourceSpecCharacteristicValue (RSCV), and defines the characteristics of each network with a pair of RSC and RSCV. The RSC indicates the name of the characteristic attribute, and the RSCV indicates a value that can be taken by the RSC. The resource entity holds, in ResourceCharacteristicValue (RCV), the value corresponding to the attribute of the RSC of ResourceSpec on which the entities are based.

Figure 4:
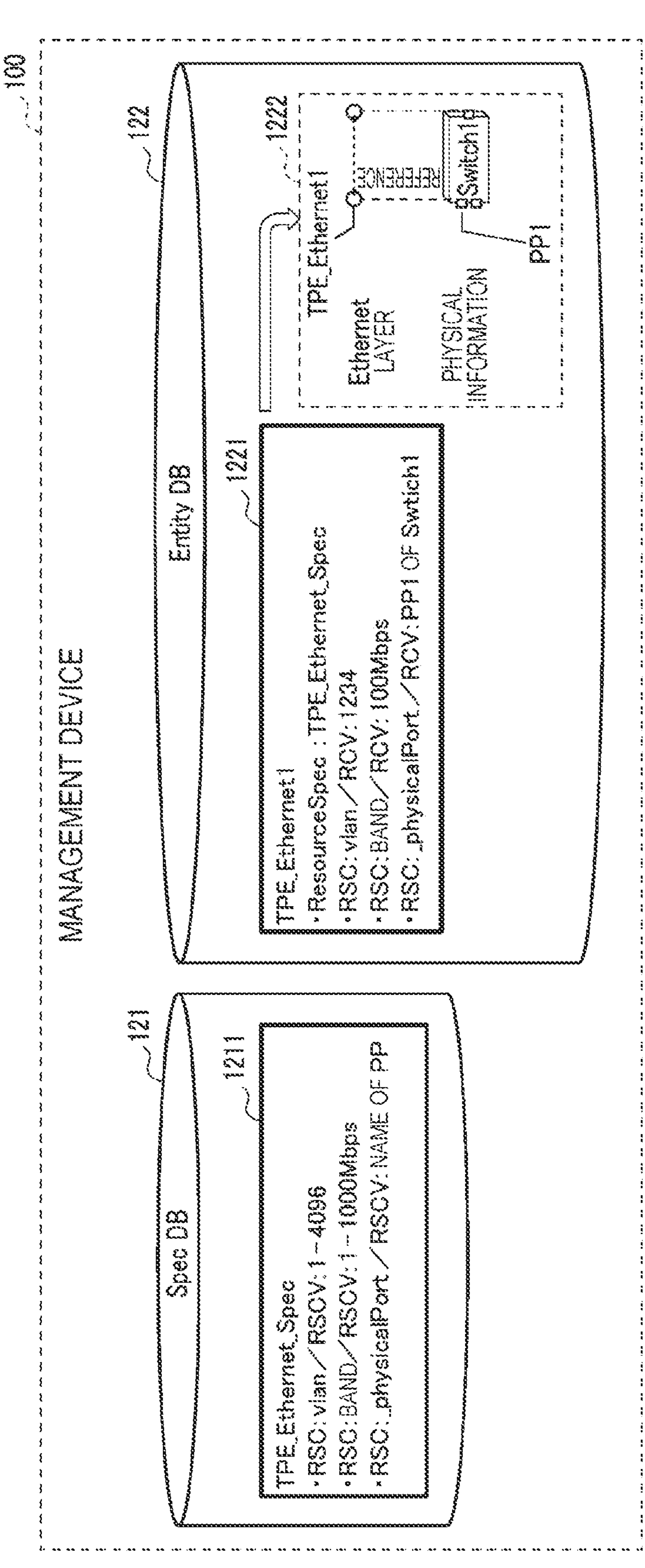
FIG. 4 is a diagram illustrating example data of a specification and an entity in the technology suggested in Non Patent Literature 1.

FIG. 4 is a diagram illustrating an example of a specification and an entity in the termination point encapsulation (TPE) in an Ethernet (registered trademark) layer according to the technology suggested in Non Patent Literature 1. As described above, the specification is stored in a specification DB 121 of a management device 100, and the entity is stored in an entity DB 122 of the management device 100.

A "TPE_Ethernet_Spec" specification 1211, which is the specification of the TPE in the Ethernet layer, defines three RSCs (vlan, band, and _physicalPort) and possible values of the respective RSCs as RSCVs. According to the specification 1211, "vlan" can take any value from "1" to "4096", "band" can take any value from "1 Mbps" to "1000 Mbps" and "_physicalPort" holds "name of PP".

A "TPE_Ethernet1" entity 1221, which is an entity in the TPE in the Ethernet layer, indicates that it is an entity created from the "TPE_Ethernet_Spec" specification 1211, in accordance with the ResourceSpec attribute. In this example, the entity 1221 holds specific values (vlan: 1234, band: 100 Mbps, _physicalPort: PP1 of Switch1) in RCVs, for the three respective RSC attributes defined in the corresponding specification 1211.

The entities stored in the entity DB 122 can be drawn and expressed in an entity diagram. For example, the "TPE_Ethernet1" entity 1221 can be expressed as in an entity diagram 1222. According to an entity diagram 1222, the "TPE_Ethernet1" entity 1221 in the Ethernet layer has a reference relationship of Switch1 in the physical layer to a PP1 entity. This indicates that the "TPE_Ethernet1" entity 1221 holds the name of the PP1 entity of Switch1 in the _physicalPort attribute. In the description below, an entity is described with reference to such an entity diagram.

Also, in the description below, a case where necessary resources are dispensed to Ethernet switches that are network devices constituting the network 2 is described as an example. It goes without saying that, in a similar manner, the management device 1 can also dispense the resources necessary for the ICT devices 3 connected to the network 2.

Figure 5:
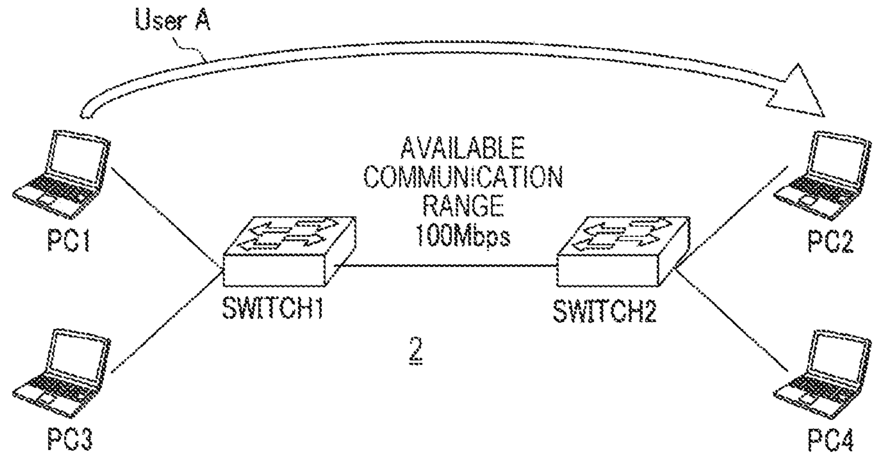
FIG. 5 is a diagram illustrating an outline of a user's request that can be received by the management device illustrated in FIG. 1.

FIG. 5 is a diagram illustrating an outline of a user's request that can be received by the management device 1 according to the embodiment. In FIG. 5, the network 2 to be managed by the management device 1 includes two Ethernet switches SWITCH1 and SWITCH2, and the cable between the switches has an available communication band of 100 Mbps.

As illustrated in FIG. 5, a user A (User A) has issued, to the network 2, a request to perform communication from a PC 1 that is an ICT device 3 to a PC 2 that is another ICT device 3. The management device 1 assigns a VLAN ID to each user, and performs setting for communication on the two Ethernet switches SWITCH1 and SWITCH2. However, the VLAN IDs to be assigned need to be the same between the Ethernet switch SWITCH1 and the Ethernet switch SWITCH2. As an example, in a case where the VLAN-ID held in the Ethernet switch SWITCH1 is 1 to 1000, and the VLAN-ID held in the Ethernet switch SWITCH2 is 100 to 200, a management device 1 to which the technology suggested in Non Patent Literature 2 is applied performs the operations (Q1) to (Q3) described below.

(Q1) First, the management device 1 receives, from a human operator, an instruction to generate network and ICT management information (entity) based on a request of a user A.

(Q2) Next, the management device 1 allocates a vacant VLAN ID from the resources held by the Ethernet switch SWITCH1, in response to the request of the user A. For example, a VLAN-ID "1", which is the smallest number in the held resources, is allocated.

(Q3) The management device 1 then allocates a vacant VLAN ID from the resources held by the Ethernet switch SWITCH2, in response to the request of the user A. For example, a VLAN-ID "100", which is the smallest number in the held resources, is allocated.

In such allocation, the allocated VLAN-IDs do not match between the Ethernet switch SWITCH1 and the Ethernet switch SWITCH2. Therefore, communication cannot be performed.

As described above, according to the technology suggested in Non Patent Literature 2, in a case where there is a difference between the VLAN-ID resources held by the devices, resources of a plurality of devices cannot be cooperatively allocated.

On the other hand, the management device 1 according to the embodiment includes the capacity management unit 10 that has a function of collectively processing a plurality of resource requests and collectively performing dispensation, receives a "logical entity generation instruction" from an operator, and cooperatively allocates resources of a plurality of devices. That is, in the management device 1 (or the network and ICT management system including the management device 1), the procedures described below are carried out, instead of (01) to (Q3) described above.

(T1) The management device 1 receives an instruction to generate network and ICT management information (entity) based on a request of a user A.

(T2) The management device 1 groups resource requests that are to be processed in cooperation, and are directed to the Ethernet switch SWITCH1 and the Ethernet switch SWITCH2.

(T3) The management device 1 acquires vacant VLAN IDs from the resources held by the Ethernet switch SWITCH1, in response to the request of the user A. For example, "1 to 1000" are acquired as the holding resources (VLAN-IDs).

(T4) The management device 1 acquires vacant VLAN IDs from the resources held by the Ethernet switch SWITCH2, in response to the request of the user A. For example, "100 to 200" are acquired as the holding resources (VLAN-IDs).

(T5) The management device 1 allocates a vacant VLAN ID common to the resources held by the two Ethernet switches SWITCH1 and SWITCH2. For example, the management device 1 allocates "VLAN-ID 100", which is the smallest number in the held resources.

As described above, with the management device 1, it is possible to perform cooperative allocation of resources of a plurality of devices.

Thus, the management device 1 according to the embodiment can cooperatively manage a plurality of resource capacities and automatically allocate necessary resources, in the network and ICT management system that does not depend on the network and ICT devices to be managed.

<1-2> Hardware Configuration

Figure 6:
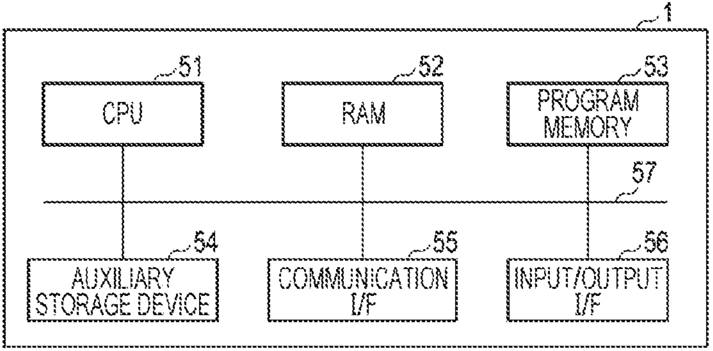
FIG. 6 is a block diagram illustrating the hardware configuration of the management device according to an embodiment of this invention.

FIG. 6 illustrates an example of the hardware configuration of the management device 1 as described above.

The management device 1 includes, as hardware, a central processing unit (CPU) 51, a random access memory (RAM) 52, a program memory 53, an auxiliary storage device 54, a communication interface (I/F) 55, an input/output interface (I/F) 56, and a bus 57. The CPU 51 communicates with the RAM 52, the program memory 53, the auxiliary storage device 54, the communication interface 55, and the input/output interface 56 via the bus 57.

The CPU 51 is an example of a general-purpose hardware processor.

The RAM 52 is used as a working memory by the CPU 51. The RAM 52 includes a volatile memory such as a synchronous dynamic random access memory (SDRAM).

The program memory 53 stores programs (including computer-executable instructions) necessary for performing various control processes according to the embodiment. As the program memory 53, a read-only memory (ROM), part of the auxiliary storage device 54, or a combination thereof is used, for example.

The processing function described with respect to the capacity management unit 10 of the management device 1 is formed by the CPU 51 executing an application program stored in the program memory 53. For example, when a management program (a computer-executable instruction) related to a capacity request acquisition process is executed by the CPU 51, the management program causes the CPU 51 to perform the series of processes described with respect to the capacity request acquisition unit 11.

The auxiliary storage device 54 stores data in a non-transitory manner. The auxiliary storage device 54 includes a nonvolatile memory such as a hard disk drive (HDD) or a solid state drive (SSD). The auxiliary storage device 54 can store various kinds of data including the network management information described with respect to the management information DB 20.

The communication interface 55 is an interface for communicating with an external communication device. The communication interface 55 includes a wired LAN terminal, for example, and is connected to a network including the Internet by a LAN cable.

The input/output interface 56 includes a plurality of terminals for connecting an input device and an output device. Examples of the input device include a keyboard, a mouse, a microphone, and the like. Examples of the output device include a display device, a speaker, and the like.

A program may be provided to the management device 1, being stored in a computer-readable storage medium. In this case, the management device 1 further includes a drive (not illustrated) that reads data from the storage medium, for example, and acquires the programs from the storage medium. Examples of the storage medium include a magnetic disk, an optical disk (such as a CD-ROM, a CD-R, a DVD-ROM, or a DVD-R), a magneto-optical disk (such as an MO), and a semiconductor memory. Alternatively, the program may be stored in a program providing server in the network, and the management device 1 may download the program from the program providing server, using the communication interface 55.

The processes described in the embodiment are not necessarily performed by a general-purpose processor such as the CPU 51 executing a program, but may be performed by a dedicated processor such as an application specific integrated circuit (ASIC).

Note that the management device 1 is not necessarily implemented by one computer (management device). The management device 1 may be implemented by a plurality of computers. For example, the management device 1 may be formed with a computer that functions as the capacity request acquisition unit 11, and a computer that functions as the capacity dispensation unit 12.

<2> Operation

Next, an information processing operation to be performed by the management device 1 designed as described above is described.

<2-1> Outline of Operation

Figure 7:
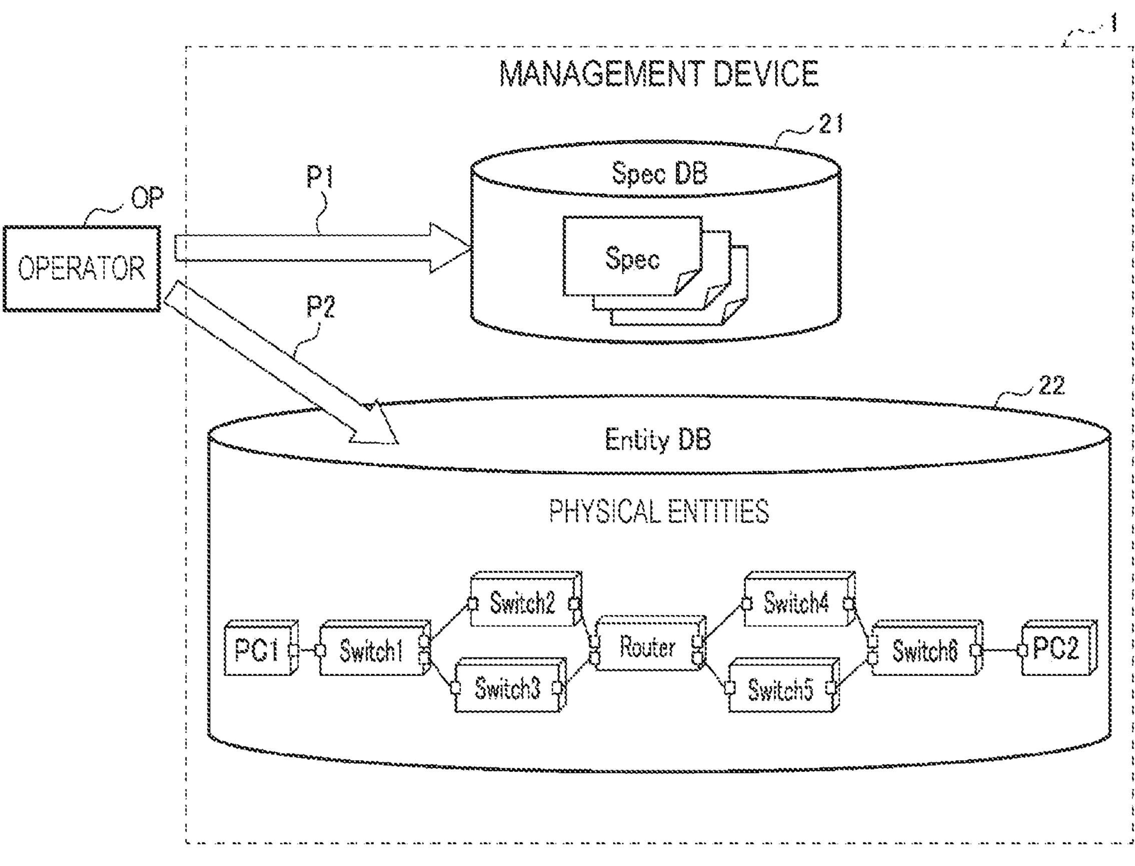
FIG. 7 is a diagram illustrating the procedures of preliminary preparation in the management device illustrated in FIG. 1.

First, an outline of an operation of the management device 1 is described, with reference to FIGS. 7 and 8.

<2-1-1> Preliminary Preparation

FIG. 7 is a diagram illustrating the procedures of preliminary preparation in the management device 1.

In step P1, the management device 1 receives an operation of an operator OP, and registers specifications that specify the characteristics of the network including network devices, or ICT devices in the specification DB 21 in advance.

In step P2, the management device 1 also generates entities (physical entities) of the physical layer with respect to the entity DB 22, in response to the operation of the operator OP.

<2-1-2> Operation of the Capacity Management Unit

FIG. 8 is a diagram illustrating an outline of an operation of the capacity management unit 10 in the management device 1.

(S1) Receiving a Capacity Request

First, in step S1, the management device 1 receives, with the capacity management unit 10, a logical entity (a capacity consuming entity) to be generated and a generation request therefor that have been input by the operator OP on the basis of a user application, and passes the logical entity and the generation request on to the capacity request acquisition unit 11.

Here, among the entities held by the management device 1, an entity that holds the capacity of a device, such as a communication band and a VLAN-ID, is referred to as a "capacity providing entity", and a logical entity generated for each user with respect to a capacity providing entity is referred to as a "capacity consuming entity".

Figure 9:
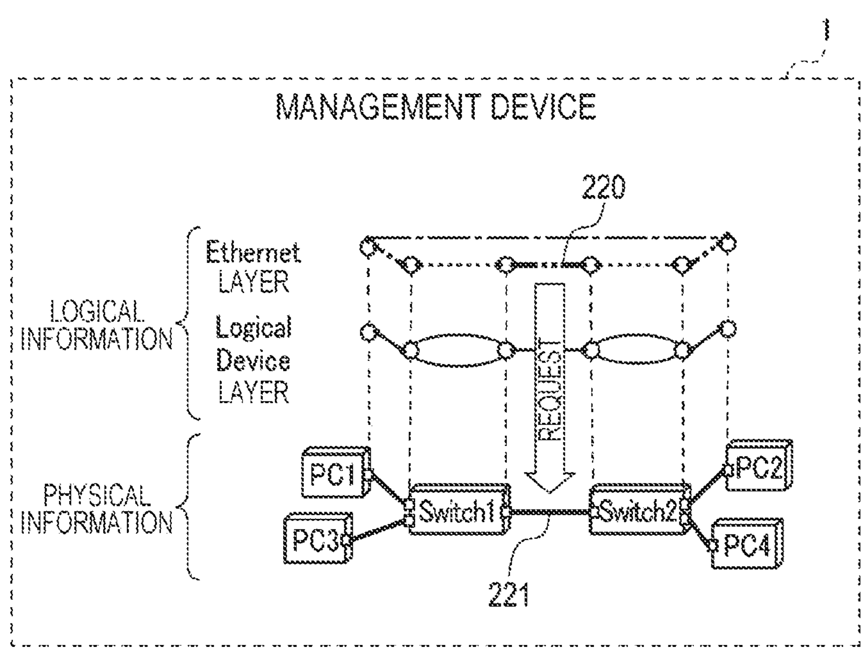
FIG. 9 is a diagram illustrating an outline of a capacity request in the management device illustrated in FIG. 1.

FIG. 9 is a diagram showing an overview of such entities and capacity requesting/providing.

As illustrated in FIG. 9, in the management device 1, a capacity is requested from a logical entity (a capacity consuming entity) 220 to a capacity providing entity 221, on the basis of a user's request.

Here, the type of capacity includes "amount" and "identifier". The "amount" is represented by a numerical quantity such as a band (100 Mbps, for example), a memory (8 GB, for example), a CPU (eight cores, for example), or the like, and is a type that uses one of the quantities held on the capacity providing entity side. The "identifier" is represented by an identifier such as a VLAN-ID (1, 2, 3, . . . , for example), or a multi-protocol label switching (MPLS) label (20, 21, . . . , for example), and is a type that uses one of the identifiers in an available identifier list held by the capacity providing entity.

Figure 10:
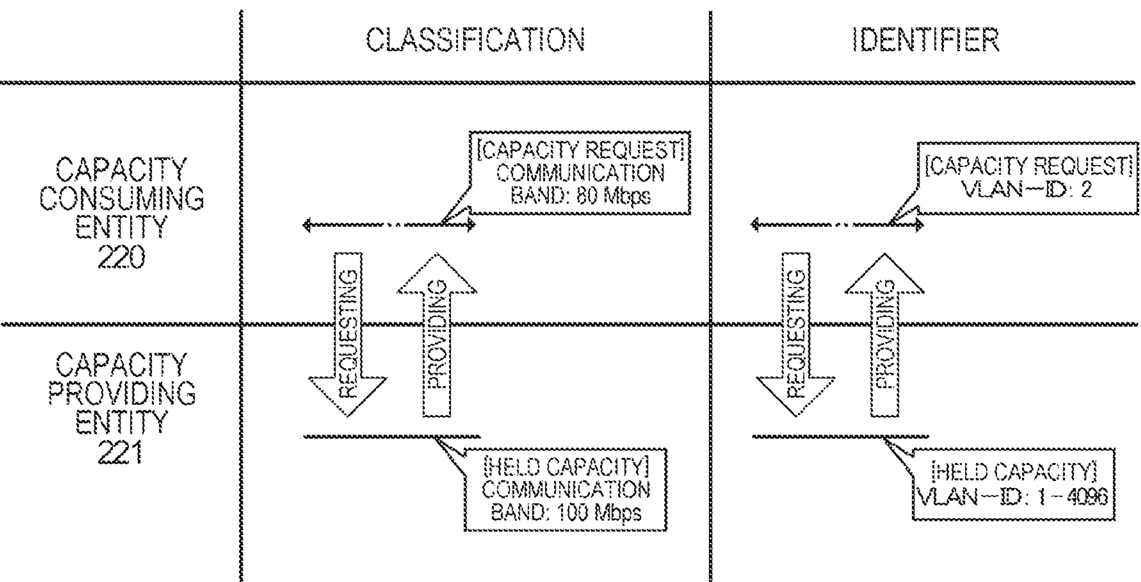
FIG. 10 is a diagram illustrating an outline of capacity request and retention in the management device illustrated in FIG. 1.

FIG. 10 is a diagram illustrating an example of capacity requests and retention with respect to such "amount" and "identifier". As for the amount, in the example in FIG. 10, the capacity consuming entity 220 requests 80 Mbps out of the 100 Mbps communication band held by the capacity providing entity 221. Meanwhile, as for the identifier, in the example in FIG. 10, the capacity consuming entity 220 requests a VLAN-ID "2" among the available VLAN-IDs 1 to 4096 held by the capacity providing entity 221.

(S2) Acquiring the Specification

Next, in step S2 in FIG. 8, the capacity request acquisition unit 11 acquires the specification (Spec) of the input capacity consuming entity from the specification DB (Spec DB) 21.

(S3) Determining Presence/Absence of a Consumption Specification Attribute In step S3, the capacity request acquisition unit 11 determines whether there is a capacity consumption specification attribute (consumeCapacityInfo) in the acquired specification. In a case where there is not a capacity consumption specification attribute in the acquired specification, the logical entity is an entity that does not need to secure a device resource capacity. In that case, the capacity request acquisition unit 11 registers the logical entity in the entity DB (Entity DB) 22, and ends the process. In a case where the acquired specification includes a capacity consumption specification attribute, the process moves on to the process described below.

(S4) Acquiring a Capacity Providing Entity

In step S4, the capacity request acquisition unit 11 accesses the entity DB 22, and acquires a capacity providing entity (an entity that holds the management target capacity and provides a capacity in response to a request), on the basis of the acquired capacity consumption specification attribute.

(S5) Creating an Equivalence Constraint Group

In step S5, the capacity request acquisition unit 11 searches for an equivalence constraint group of capacity consuming entities on the basis of the acquired capacity consumption specification attribute, and creates an equivalence constraint group. An equivalence constraint refers to a constraint condition for grouping capacity consumption resources to dispense the same value in cooperation from the capacities of a plurality of device resources.

(S6) Requesting Dispensation

In step S6, the capacity request acquisition unit 11 generates a dispensation request, and requests the capacity dispensation unit 12 to perform capacity dispensation. The dispensation request includes information for identifying the capacity providing entity, a dispensation function to be used for dispensation, and information for identifying the required amount or the required value. In this case, the information for identifying the capacity providing entity is information for identifying a plurality of capacity providing entities that are based on the equivalence constraint group and are to dispense the same value.

(S7) Acquiring a Dispensation Function

In step S7, the capacity dispensation unit 12 acquires the capacity dispensation function necessary for dispensation from the function repository 23, on the basis of the dispensation request received from the capacity request acquisition unit 11.

(S8) Allocating a Capacity

In step S8, the capacity dispensation unit 12 dispenses a capacity, using the acquired dispensation function. That is, the capacity dispensation unit 12 allocates the requested capacity to the logical entity as the requestor. In a case where the dispensation result (requested amount/requested value) is no good (the request cannot be fulfilled), the capacity dispensation unit 12 suspends the process.

(S9) Registering a Capacity

Lastly, in step S9, the management device 1 registers the capacity consuming entity on the basis of the dispensation result obtained in step S8, and registers information about the dispensed capacity regarding the capacity providing entity.

<2-1-3> Capacity Request and Allocation

Figure 11:
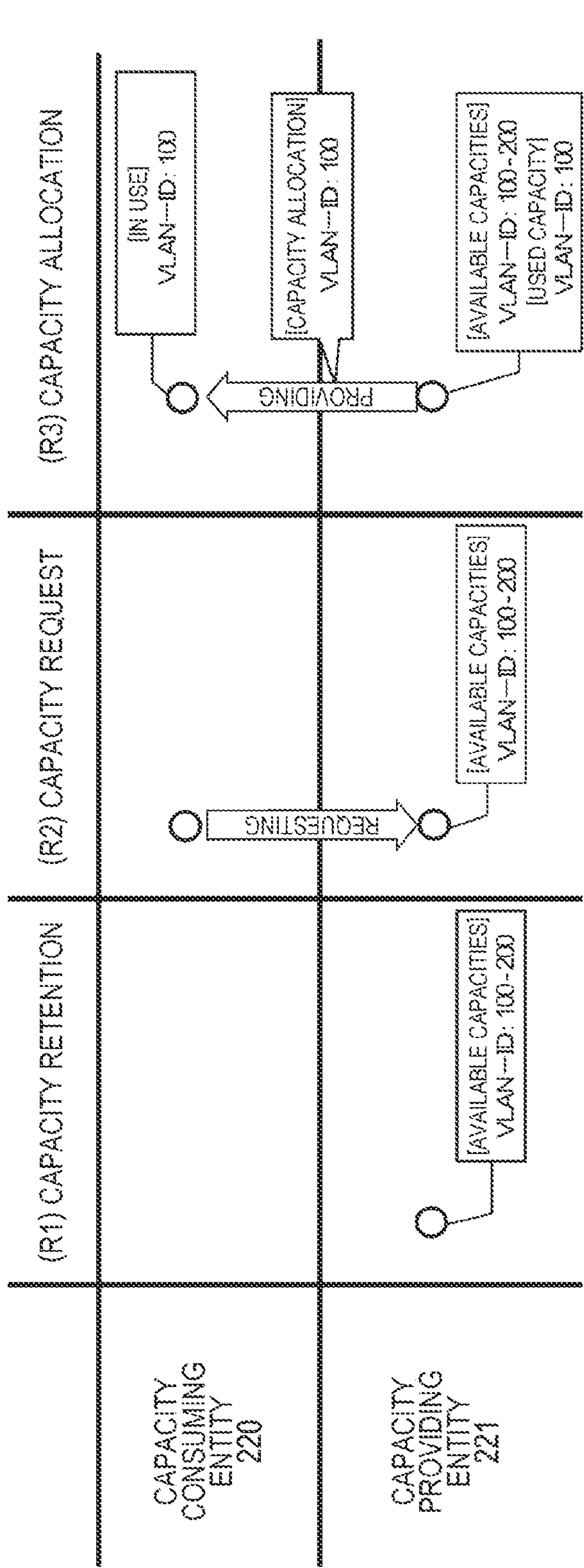
FIG. 11 is a diagram illustrating an outline of a flow of a capacity allocation process in a case where there is not an equivalence constraint group in the management device illustrated in FIG. 1.

FIG. 11 is a diagram illustrating an outline of the process from requesting a capacity to allocating the capacity in a case where there is not an equivalence constraint group.

In this case, the management device 1 performs a process not involving cooperative allocation, like (R1) to (R3) described below.

(R1) The management device 1 causes a capacity providing entity 221 to hold available capacities (VLAN-IDs 100 to 200 in this example) in advance.

(R2) A capacity request is sent from a capacity consuming entity 220 to the capacity providing entity 221.

(R3) In a case where available capacity—used capacity—requested capacity>0 is established, the capacity dispensation unit 12 determines that allocation is possible (OK). In a case where allocation is possible, the capacity dispensation unit 12 updates the used capacity of the capacity providing entity 221 (to the VLAN-ID "100" in this example), and allocates (provides) the requested capacity (the VLAN-ID "100" in this example) to the logical entity as the requestor, as illustrated in the drawing.

Figure 12:
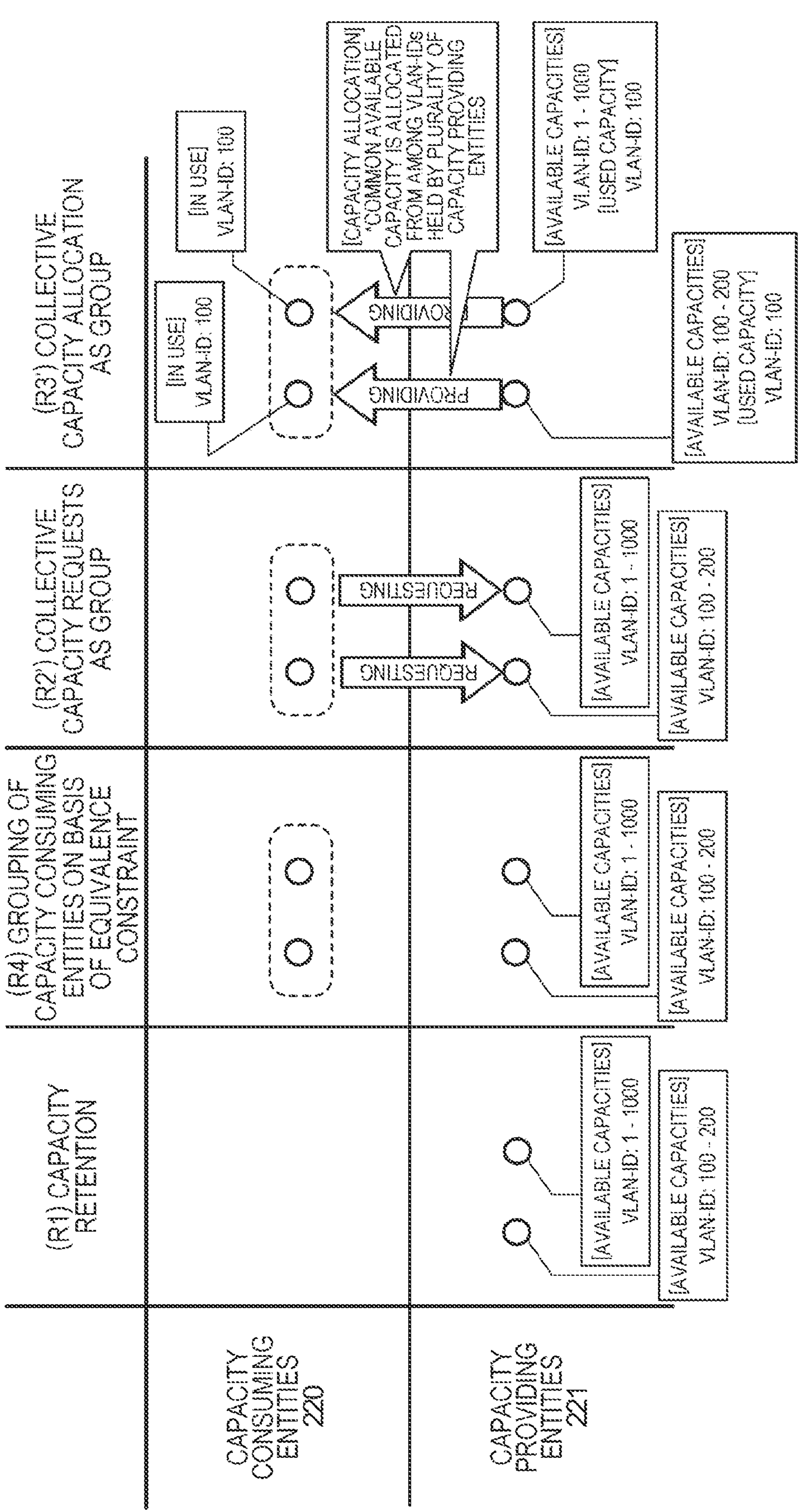
FIG. 12 is a diagram illustrating an outline of a flow of a capacity allocation process in a case where grouping by an equivalence constraint is adopted in the management device illustrated in FIG. 1.

FIG. 12 is a diagram illustrating an outline of the process from requesting a capacity to allocating the capacity in a case where grouping by an equivalence constraint is adopted.

In this case, the management device 1 performs a process capable of cooperative allocation, like (R1) to (R3') described below.

(R1) The management device 1 causes capacity providing entities 221 to hold available capacities (VLAN-IDs 1 to 1000, and VLAN-IDs 100 to 200 in this example) in advance.

(R4) Capacity consuming entities 220 are grouped by an equivalence constraint.

(R2') Capacity requests are collectively sent from the grouped capacity consuming entities 220 to the capacity providing entities 221.

(R3') The capacity dispensation unit 12 enables cooperative allocation by performing capacity allocation on the basis of grouping. That is, the capacity dispensation unit 12 allocates a common available capacity (the VLAN-ID "100" in this case) from among the VLAN-IDs of the plurality of capacity providing entities 221.

Here, the management device 1 further defines capacity-related attributes for the entities in the network and ICT management architecture, to express capacity requests and provision.

FIG. 13 is a diagram illustrating the definitions of attributes of a capacity consuming entity as an example of such capacity-related attributes.

As illustrated in FIG. 13, in a capacity consuming entity 220, "Name (entity name)", "RSC (the name of the attribute for each a capacity is requested)", and "RCV (the value/amount corresponding to the capacity attribute name)" are defined. As described above, the capacity consuming entity 220 holds capacity request amounts as a pair of RSC/RCV. The pair of RSC/RCV indicates the requested amounts, and also serves to hold dispensed capacities. As illustrated in the drawing, one entity can hold a plurality of capacity requests. Data examples will be described later.

FIG. 14 is a diagram illustrating the definitions of attributes of a capacity providing entity as another example of the capacity-related attributes.

As illustrated in FIG. 14, "name (entity name)" and "capacity (a record of available capacities and the capacity already provided to the requestor entity)" are defined as attributes of a capacity providing entity 221. As illustrated in the drawing, one entity can hold a plurality of capacities to be provided.

A "capacity" attributes includes child elements that are "name (the name of a capacity to be provided)", "units (units of the capacities to be provided (denoted by [-] because this is not necessary in the case of a value list))", "CapacityAmount (the range of amounts or values of available capacities)", and "CapacityDemand (a record of the already provided capacity) (a plurality of capacities can be set)". "CapacityDemand" further includes "CapacityDemandAmount (the amount or value of the already provided capacity)" and "entityName (the name of the entity as the destination of provision)". Data examples will also be described later.

<2-1-4> Capacity Retention

FIG. 15 is a diagram illustrating an outline of capacity retention using the data examples illustrated in FIGS. 13 and 14. In FIG. 15, the connection relationship in the logical layer (the Ethernet layer and the Logical Device layer), the connection relationship in the physical layer (including Switch1 and Switch2), and the reference relationship between the logical layer and the physical layer are held in the entity DB 22.

As data examples of the capacity consuming entity 220, Name "Switch1-Switch2_FRE_UserA", which is a capacity request with respect to a user A, and Name "Switch1-Switch2_FRE_UserB", which is a capacity request with respect to a user B, are shown. In FIG. 15, "Switch1-Switch2_FRE_UserA" requests a band=60 and a VLAN-ID=1, and "Switch1-Switch2_FRE_UserB" requests a band=30 and a VLAN-ID=2.

As a data example of the capacity providing entity 221, Name "Switch1-Switch2_PL", which has a reference relationship with the above capacity requests with respect to the user A and the user B above, is shown. With the Capacity attribute of "Switch1-Switch2_PL" shown in FIG. 15, the available band is 100 Mbps according to "name=band, units=Mbps, CapacityAmount=100", and the available VLAN-IDs are "1 to 4096" according to "name=VLAN-ID, CapacityAmount=1-4096".

Further, regarding "band", the CapacityDemand attributes of the capacity providing entity 221 indicate that there is a record that a band "60 Mbps" has already been provided to the entity "Switch1-Switch2_FRE_UserA" according to "CapacityDemandAmount=60, entityName=Switch1-Switch2_FRE_UserA", and the band "30 Mbps" has already been provided to the entity "Switch1-Switch2_FRE_UserB" according to "CapacityDemandAmount=30, entityName=Switch1-Switch2_FRE_UserB".

Likewise, regarding "VLAN-ID", the CapacityDemand attributes of the capacity providing entity 221 indicate that there is a record that the VLAN-ID "1" has already been provided to the entity "Switch1-Switch2_FRE_UserA" according to "CapacityDemandAmount=1, entityName=Switch1-Switch2_FRE_UserA", and the VLAN-ID "2" has already been provided to the entity "Switch1-Switch2_FRE_UserB" according to "CapacityDemandAmount=2, entityName=Switch1-Switch2_FRE_UserB".

Further, the specification (Spec) on which a capacity consuming entity is based has a capacity consumption specification attribute (consumeCapacityInfo) indicating how the capacity is to be consumed.

FIG. 16 is a diagram illustrating an example of such a specification of a capacity consuming entity.

As illustrated in FIG. 16, a specification 211 of a capacity consuming entity "Switch2_Eth_TPE1" defined by the entity DB 22 is obtained by referring to the specification DB 21, and is defined under the name "TPE_Ethernet_Spec" in FIG. 16. For example, such a specification 211 is appropriately designed by the operator OP in response to a request from the user, and is stored in response to an operation of the operator OP in the process of the preliminary preparation. The attributes shown in FIG. 16 are further described with reference to FIGS. 17A and 17B.

FIGS. 17A and 17B are diagrams illustrating the definition of capacity consumption specification attributes (consumeCapacityInfo), in conjunction with the data example of the specification 211 illustrated in FIG. 16.

The capacity consumption specification attributes include "name (name of Spec)", "RSC (the name of the attribute indicating the characteristics of the network or the ICT device)", "RSCV (the range of possible values of the attribute)", and "ConsumeCapacityInfo (information regarding capacity consumption)".

"ConsumeCapacityInfo" includes, as child elements, "Attribute (the name of the attribute for which a capacity is requested) (which needs to be defined in RSC)", "consume FuncName (the name of the function to be used for capacity dispensation)", "Provider (information for identifying the capacity providing entity)", and "constrainedSameValues (the constraint condition (referred to as an equivalence constraint) for grouping capacity consumption resources to which the same value is to be dispensed in cooperation from the capacities of a plurality of device resources)".

The Provider attributes surrounded by a dashed line in FIG. 17A are shown in an array format in practice. When the reference relationship between entities is traced starting from the capacity consuming entity in the order of the array of the Provider attributes, the end of the array points to a capacity providing entity. This method of searching for a capacity providing entity will be described later.

The above Provider attributes further include "ObjectType (the type of the entity to be referred to (PD, PP, PL, TL, NED, TPE, FRE (NC), FRE (LC), or FRE (XC)))", "ReferDirection (the direction of reference: "Forward" meaning the forward direction, "Reverse" meaning the reverse direction)", "ReferKey (the attribute name serving as a key for referring to the next entity)", "ConstrainedKey (key information for narrowing down a plurality of reference destination candidates in conjunction with a constraint condition) ", and "ConstrainedValue (the value corresponding to the above key)".

The constrainedSameValues attributes surrounded by a dashed line in FIG. 17B are shown in an array format in practice. When the reference relationship between entities is traced starting from the capacity consuming entity in the order of the array of the constrainedSameValues attributes, the last entity group (s) of the array is grouped. This method of grouping by an equivalence constraint will be described later.

Like the Provider attributes described above, the constrainedSameValues attributes also include "ObjectType", "ReferDirection", "ReferKey", "ConstrainedKey", and "ConstrainedValue".

<2-1-5> Search for a Capacity Providing Entity

FIG. 18 is a diagram illustrating an outline of the method of searching for a capacity providing entity 221 on the basis of the Provider attributes described above. A data example 211 of a capacity consumption specification illustrated in FIG. 17 is the same as the specification 211 illustrated in FIGS. 16 and 17A.

In the management device 1 according to the embodiment, the capacity providing entity 221 is searched for by the capacity request acquisition unit 11. The capacity request acquisition unit 11 searches the entities in the reference relationship in the order of the Provider array in either Forwarding (the forward direction) or Reverse (the reverse direction), as viewed from the capacity consuming entity 220. This is conducted by sequentially searching the array of the Provider attributes from 0 to the end. The reference relationship is expressed by RSCs/RCVs of the respective entities. Note that, in a case where there is a plurality of search candidates, it is also possible to conduct a search while narrowing the target entities with a combination of ConstrainedKey/Value for each reference relationship. The capacity request acquisition unit 11 eventually conduct the search to the end of the array, and identifies the entity acquired in the last reference relationship in the array as the capacity providing entity 221.

This search process is now further described, with reference to the example illustrated in FIG. 18.

First, in step S41, the capacity request acquisition unit 11 searches for the TPE entity (a "Switch1_LD_TPE1" entity 223, in this example) to be referred to with the RSC "_serverTperRef" of a TPE entity (a "Switch1_Eth_TPE1" entity 222 in this example). This step is a Forwarding (forward direction) search. Here, in a case where there is a plurality of candidates, the capacity request acquisition unit 11 selects one that satisfies a combination of Constrained-Key/Value (layerProtocolName=LogicalDevice).

In step S42, the capacity request acquisition unit 11 searches for the PP entity (a "Switch1_PP1" entity 224 in this example) to be referred to with the RSC "_physicalPort" of the searched TPE entity. This step is a Forwarding (forward direction) search.

The entity 221 eventually acquired through the search process as described above is the capacity providing entity.

<2-1-6> Grouping by an Equivalence Constraint

FIG. 19 is a diagram illustrating an outline of a grouping method based on the constrainedSameValues attributes described above. A data example 211 of a capacity consumption specification illustrated in FIG. 19 is the same as the specification 211 illustrated in FIGS. 16 and 17B.

In the management device 1 according to the embodiment, grouping by an equivalence constraint is performed by the capacity request acquisition unit 11. The capacity request acquisition unit 11 searches for the entity to be subjected to the equivalence constraint in the order of the constrainedSameValues array, as viewed from the capacity consuming entity 220. The search method is the same as the search for the capacity providing entity. The capacity request acquisition unit 11 groups all the capacity consuming entities, using the searched entity group as the entity to be subjected to the equivalence constraint.

This grouping is now further described, with reference to the example illustrated in FIG. 19. Note that steps S51 and S52 are the same as steps S41 and S42 described above in the search for the capacity providing entity, and therefore, explanation of them is not repeated herein.

In step S53, the capacity request acquisition unit 11 searches for the PL entity (a "Switch1-Switch2_PL" entity 225 in this example) that refers to the searched PP entity (a "Switch1_PP1" entity 224 in this example) with the RSC "_physicalPort". This step is a Reverse (reverse direction) search.

In step S54, the capacity request acquisition unit 11 searches for the PP entity (a "Switch2_PP1" entity 226 in this example) to be referred to with the RSC "_physicalPort" of the searched PL entity. This step is a Forwarding (forward direction) search.

In step S55, the capacity request acquisition unit 11 searches for the TPE entity (a "Switch2_LD_TPE1" entity 227 in this example) that refers to the searched PP entity with the RSC "_physicalPort". This step is a Reverse (reverse direction) search.

In step S56, the capacity request acquisition unit 11 searches for the TPE entity (a "Switch2_Eth_TPE1" entity 228 in this example) that refers to the searched TPE entity with the RSC "_serverTpeRef". This step is a Reverse (reverse direction) search. Here, in a case where there is a plurality of candidates, the capacity request acquisition unit 11 selects one that satisfies a combination of Constrained-Key/Value (layerProtocolName=Ethernet).

The entity group searched for in the search process as described above is the capacity providing entity to be grouped as the equivalence constraint target.

<2-1-7> Capacity Dispensation and Result Registration

Figure 21:
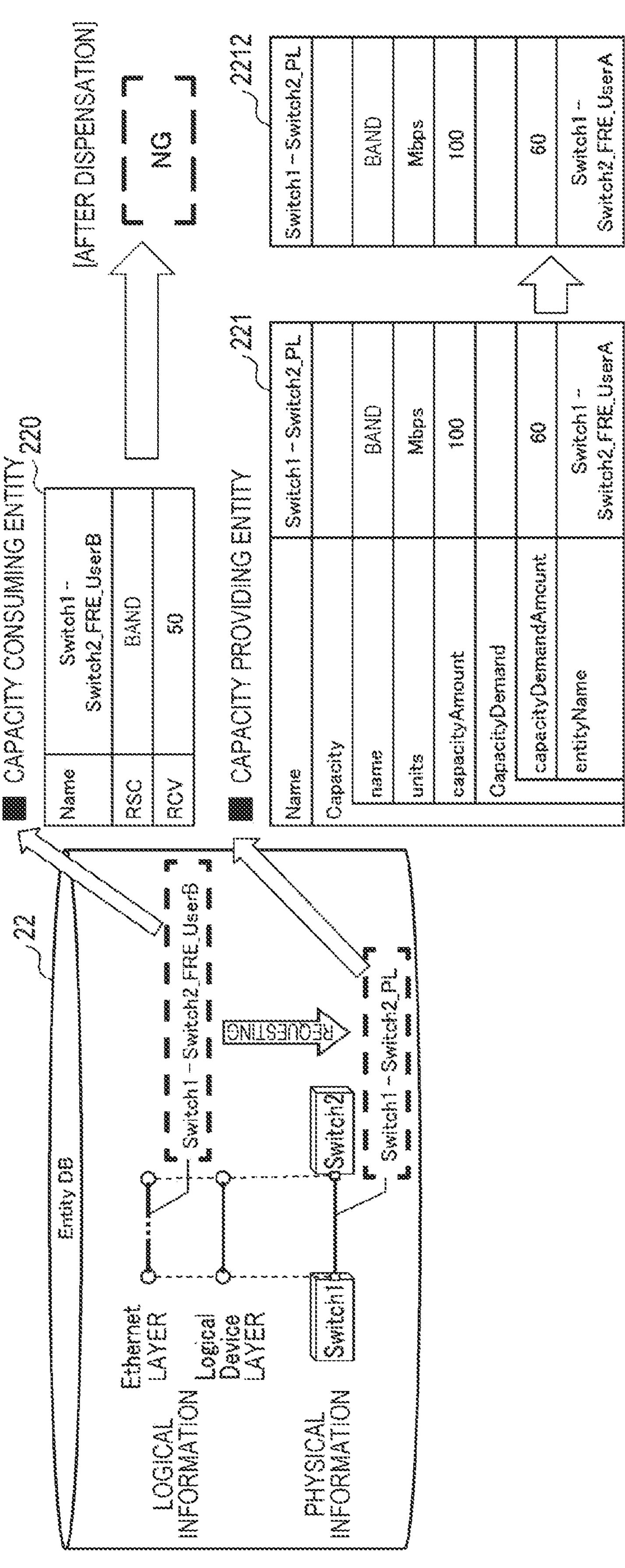
FIG. 21 is a diagram illustrating a second example of capacity dispensation in the management device illustrated in FIG. 1.

Next, referring to FIGS. 20 to 22, capacity dispensation and dispensation result registration are described through three examples ("successful amount dispensation", "failed amount dispensation", and "dispensation of a value list").

(i) Amount Dispensation: Successful

FIG. 20 is a diagram illustrating an example case where capacity dispensation is "successful".

The capacity dispensation unit 12 has received a dispensation request as follows.

Operation type: dispensation

Capacity consuming entity→capacity providing entity: Switch1-Switch2_FRE_UserA→Switch1-Switch2_PL Equivalence constraint group: none Capacity dispensation function name: amount dispensation function Requested amount/requested value: band/60

In this example, the capacity "band" held by the capacity providing entity 221 is 100 Mbps in total (CapacityAmount), and dispensation has not yet been performed for any entity (any value is not registered in CapacityDemand). Therefore, the capacity dispensation unit 12 determines that dispensation can be performed for the requested amount of 60 Mbps, and performs dispensation of the required amount of 60 Mbps. The capacity dispensation unit 12 determines the amount requested by the capacity consuming entity 220 as the requestor (2201), and adds the dispensed requested amount of 60 Mbps and the entity (Switch1-Switch2_FRE_UserA) as the provision destination to the provided capacity (CapacityDemand) in the capacity providing entity 221 (2211).

(ii) Amount Dispensation: Failed

FIG. 21 is a diagram illustrating an example case where capacity dispensation is "failed (no good)".

The capacity dispensation unit 12 has received a dispensation request as follows.

Operation type: dispensation

Capacity consuming entity→capacity providing entity: Switch1-Switch2_FRE_UserB→Switch1-Switch2_PL Equivalence constraint group: none Capacity dispensation function name: amount dispensation function Requested amount/requested value: band/50

In this example, the capacity "band" held by the capacity providing entity 221 is 100 Mbps in total (CapacityAmount), and 60 Mbps has already been dispensed ("60" has already been allocated to Switch1-Switch2_FRE_UserA, as registered in CapacityDemand). Therefore, the capacity dispensation unit 12 determines that the dispensation is not possible for the current requested amount of 50 Mops, and the dispensation result indicates "no good" (failed). Accordingly, the capacity dispensation unit 12 does not update the capacity providing entity 221 (2212).

(iii) Identifier Dispensation: A List of Values

FIG. 22 is a diagram illustrating an example case where capacity dispensation is performed for a "list of values".

The capacity dispensation unit 12 has received a dispensation request as follows.

Operation type: dispensation

Capacity consuming entity→capacity providing entity: Switch1_Eth_TPE1→Switch1_PP1, Switch2_Eth_TPE1→Switch2_PP1

Equivalence constraint group: Switch1_Eth_TPE1, Switch2_Eth_TPE1

Capacity dispensation function name: value list dispensation (small numbers) function Requested amount/requested value: VLAN-ID In this example, the capacity "VLAN-ID" held by the capacity providing entity requested by the two capacity consuming entities constituting the equivalence constraint group has a total amount (CapacityAmount) of 1 to 1000 and 100 to 200, dispensation has not yet been performed for either entity (any value is not registered in CapacityDemand), and there is a common unused ID. Therefore, the capacity dispensation unit 12 determines that dispensation can be performed in response to a new dispensation request. Since the function designated this time is a "value list dispensation (small numbers) function", the capacity dispensation unit 12 dispenses the smallest number "1" from among the available IDs. The capacity dispensation unit 12 determines the RCV "100" of a VLAN-ID to be the request of the capacity consuming entity 220 that is the requestor (2203), and adds the dispensed request "100" and the entities (Switch1_PP1, Switch2_Eth_TPE1) as the provision destinations to the provided capacity (CapacityDemand) in the capacity providing entity 221 (2213).

<2-2> Processing Flow

Next, an outline of the operation to be performed by the management device 1 as described above is described again with the use of a processing flow.

FIG. 23 is a flowchart showing the processing procedures and the processing details. Steps S1 to S9 in FIG. 23 correspond to steps S1 to S9 illustrated in FIG. 8. Note that the preliminary preparation steps P1 to P2 described with reference to FIG. 7 have been carried out in advance.

The management device 1 monitors the presence/absence of an input from the operator OP with the capacity management unit 10, and starts performing the following process when receiving an input from the operator OP.

In step S1, in the management device 1, the capacity request acquisition unit 11 receives a request for a capacity consuming entity as a logical entity to be generated, from the operator OP.

Next, in step S2, in the management device 1, the capacity request acquisition unit 11 acquires the specification (Spec) of the input capacity consuming entity from the specification DB (Spec DB) 21.

In step S3, in the management device 1, the capacity request acquisition unit 11 determines whether the specification acquired from the specification DB 21 has a capacity consumption specification attribute (consumeCapacityInfo). If the result of the determination indicates that the acquired specification does not have any capacity consumption specification attribute (NO), the entity does not need to secure any device resource capacity, and therefore, the management device 1 moves on to step S10. In step S10, the management device 1 registers the logical entity in the entity DB (Entity DB) 22, and ends the process. If it is determined in step S3 that the acquired Spec has a capacity consumption specification attribute (YES), on the other hand, the process moves on to step S4.

In step S4, in the management device 1, the capacity request acquisition unit 11 searches the reference relationship between entities using the acquired consumeCapacityInfo, and identifies the capacity providing entity.

In step S5, in the management device 1, the capacity request acquisition unit 11 searches for an equivalence constraint group of capacity consuming entities on the basis of the acquired consumeCapacityInfo, and creates an equivalence constraint group.

In step S6, in the management device 1, the capacity request acquisition unit 11 generates a capacity dispensation request, and requests the capacity dispensation unit 12 to perform capacity dispensation. Along with this request, the capacity request acquisition unit 11 sends the following information to the capacity dispensation unit 12.

Operation type: "dispensation" in a case where a capacity consuming entity is to be newly registered, "return" in a case where the capacity consuming entity is to be deleted, and "change of request amount" in a case where an attribute value of the entity is to be changed Capacity providing entity: Name of the capacity providing entity identified from the capacity consuming entity and as a result of the search in step S4

Equivalence constraint group: Name of the capacity consuming entity included in the equivalence constraint group created in step S5

Capacity dispensation function name: consumeFuncName in consumeCapacityInfo in the capacity consuming entity Requested amount/requested value: RSC/RCV designated by consumeCapacityInfo in the capacity providing entity Next, in step S7, in the management device 1, the capacity dispensation unit 12 acquires, from the function repository 23, the capacity dispensation function requested by the capacity request acquisition unit 11.

In step S8, in the management device 1, the capacity dispensation unit 12 dispenses a capacity, using the acquired dispensation function. If the capacity dispensation is successful (YES), the process moves on to step S9. The dispensation result includes the requested amount/requested value. If the capacity dispensation result indicates "failed (no good)" (NO), the process is suspended.

In step S9, in the management device 1, the capacity dispensation unit 12 registers information about the provided capacity (provided amount/value) in the capacity consuming entity as the capacity provision destination and the capacity providing entity, on the basis of the dispensation result.

<3> Example

Next, the process according to the embodiment described above is further described in detail through an example. FIGS. 24 to 28 are diagrams illustrating the example.

<3-1> Preliminary Preparation

Figure 24:
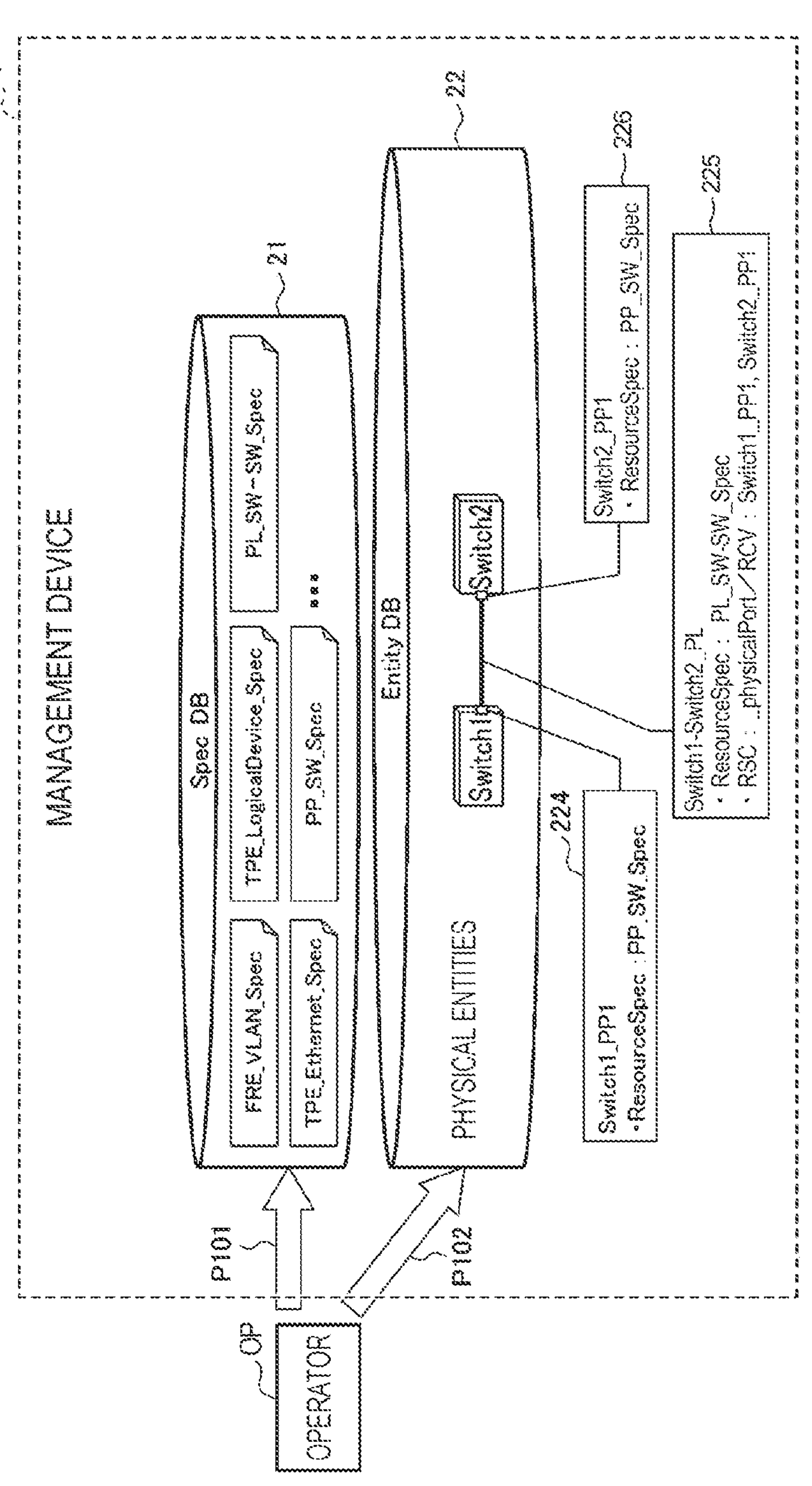
FIG. 24 is a diagram illustrating an example of the procedures of preliminary preparation in the management device illustrated in FIG. 1.

FIG. 24 is a diagram illustrating the procedures of preliminary preparation.

In step P101, the management device 1 receives an operation of an operator OP, and registers specifications that specify the characteristics of the network or ICT devices in the specification DB 21. In the example illustrated in FIG. 24, "FRE_VLAN_Spec", "TYPE_LogicalDevice_Spec", "PL_SW-SW_Spec", "TPE_Ethernet_Spec", "PP_SW_Spec", and the like are registered in the specification DB 21.

In step P102, the management device 1 also generates entities of the physical layer with respect to the entity DB 22, in response to the operation of the operator OP. In the example in FIG. 24, two switches (Switch1 and Switch2), an entity 224 related to a communication port of the switch Switch1, an entity 225 related to a connection cable between the two switches, and an entity 226 related to a communication port of the switch Switch2 are generated as physical entities.

<3-2> Capacity Request Acquisition

FIG. 25 is a diagram illustrating the processing procedures of capacity request acquisition to be performed by the capacity request acquisition unit 11.

First, in step S101, the management device 1 receives, with the capacity management unit 10, a capacity consuming entity generation request that has been input by the operator OP, and passes the request on to the capacity request acquisition unit 11. In the example illustrated in FIG. 25, the management device 1 receives a request for generation of a "Switch1_Eth_TPE" entity 222 and a "Switch2_Eth_TPE1" entity 228. These entities 222 and 228 correspond to the entities present in the middle of the search illustrated in FIGS. 18 and 19, and are appropriately designed by the operator OP in response to a request from the user, for example.

Next, in step S102, the capacity request acquisition unit 11 acquires the specification (Spec) of the received capacity consuming entity from the specification DB (Spec DB) 21, and checks whether the specification has a capacity consumption specification (consumeCapacityInfo). In the example in FIG. 25, the specification "TPE_Ethernet_Spec" defined by the "ResourceSpec" in the capacity consuming entity 220 is acquired from the specification DB 21. The details of "TPE_Ethernet_Spec" indicated by a dashed line in FIG. 25 are the same data example as 211 illustrated in FIGS. 18 and 19, and consumeCapacityInfo is included. As described above, in a case where it is determined that the TPE_Ethernet_Spec acquired in step S102 has consumeCapacityInfo, the capacity request acquisition unit 11 moves on to step S103.

In step S103, the capacity request acquisition unit 11 accesses the entity DB 22 using the consumeCapacityInfo of the TPE_Ethernet_Spec, searches the reference relationship between entities, and identifies and acquires capacity providing entities as illustrated in the entity DB 22 in FIG. 25. The capacity request acquisition unit 11 further generates a capacity dispensation request, on the basis of the consumeCapacityInfo.

<3-3> Creation of an Equivalence Constraint Group

FIG. 26 is a diagram illustrating the processing procedures of equivalence constraint group creation to be performed by the capacity request acquisition unit 11.

In step S104, the capacity request acquisition unit 11 searches for an equivalence constraint group of capacity consuming entities on the basis of the consumeCapacityInfo, and creates an equivalence constraint group 501. In this example, the equivalence constraint group 501 includes Switch1_Eth_TPE1 and Switch2_Eth_TPE1.

<3-4> Dispensation Request Reception and Dispensation Function Acquisition

Figure 27:
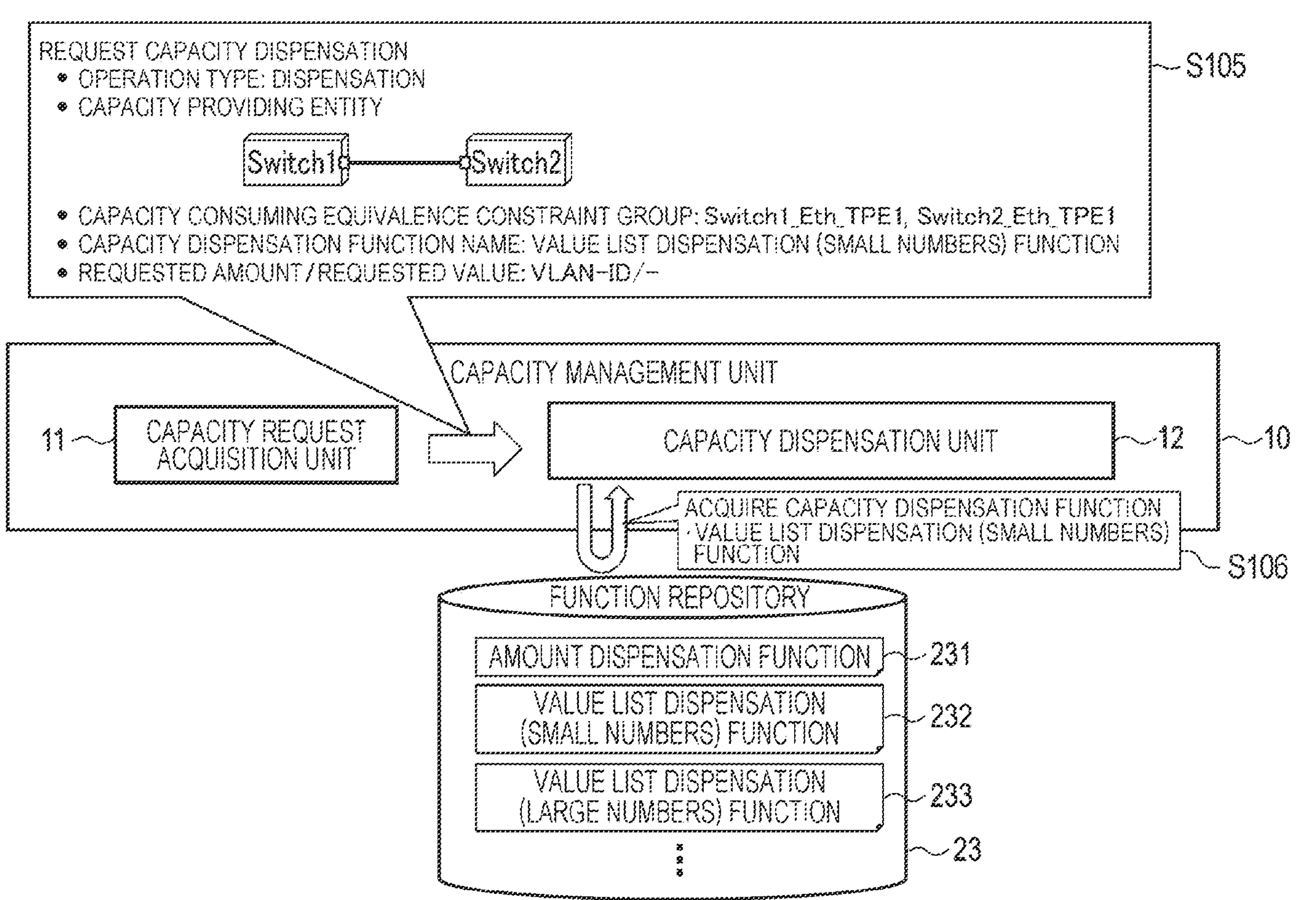
FIG. 27 is a diagram illustrating an example of the processing procedures till dispensation function acquisition to be performed by a capacity dispensation unit of the management device illustrated in FIG. 1.

FIG. 27 is a diagram illustrating the processing procedures from dispensation request reception to dispensation function acquisition to be performed by the capacity dispensation unit 12.

In step S105, the capacity request acquisition unit 11 passes the capacity dispensation request generated on the basis of the consumeCapacityInfo and the created equivalence constraint group 501, on to the capacity dispensation unit 12. The capacity dispensation request includes the following information in this example.

Operation type: dispensation
Capacity providing entity information
Capacity providing entity
Equivalence constraint group: Switch1_Eth_TPE1, Switch2_Eth_TPE1
Capacity dispensation function name: value list dispensation (small numbers) function
Requested amount/requested value: VLAN-ID Next, in step S106, the capacity dispensation unit 12 acquires a function having the designated capacity dispensation name from the function repository 23, on the basis of the received dispensation request. In this example, the capacity dispensation unit 12 acquires the value list dispensation (small numbers) function 232.

<3-5> Capacity Dispensation and Registration

Figure 28:
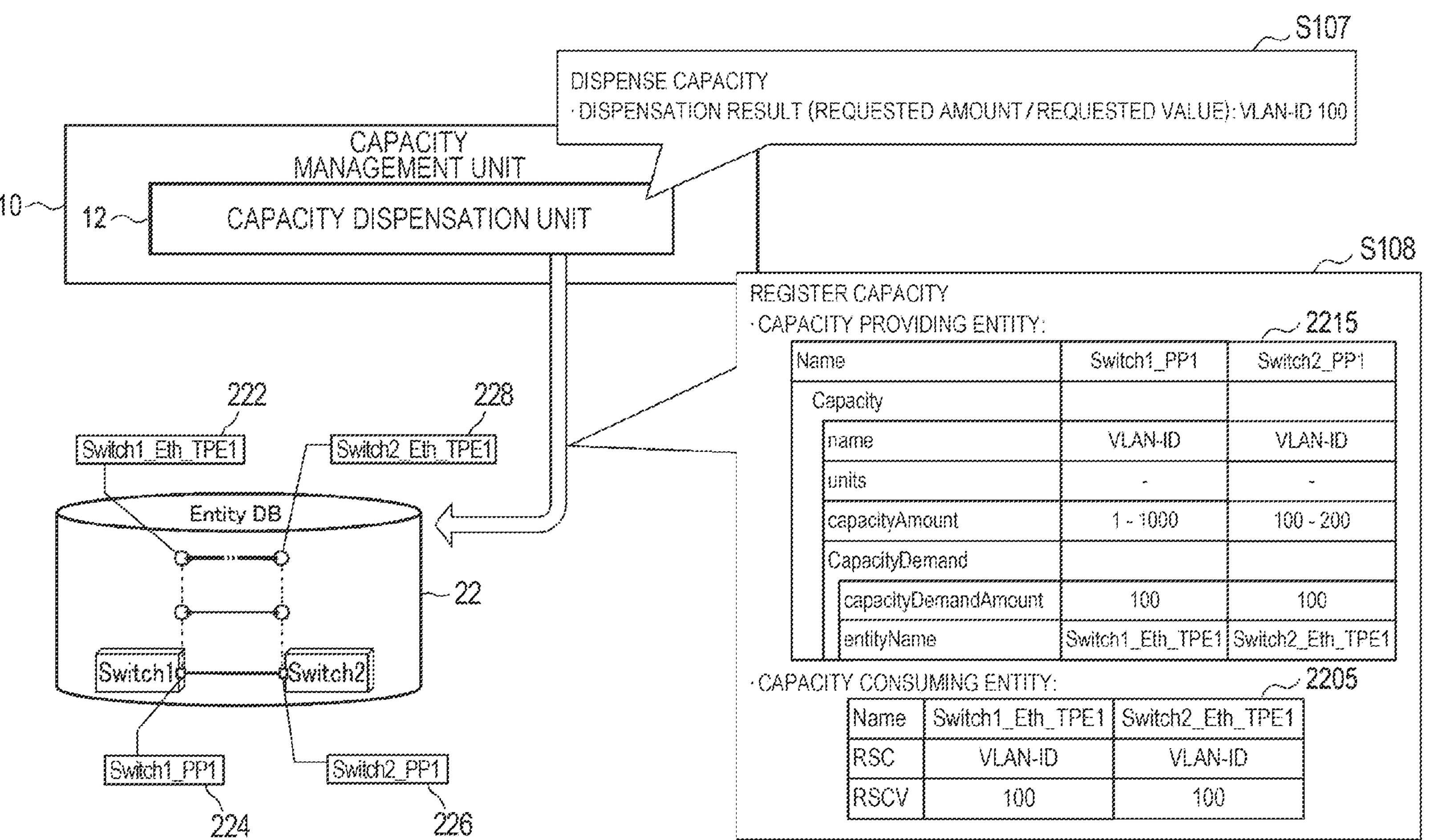
FIG. 28 is a diagram illustrating an example of the processing procedures till registration to be performed by the capacity dispensation unit of the management device illustrated in FIG. 1.

FIG. 28 illustrates the processing procedures till capacity dispensation and registration to be performed by the capacity dispensation unit 12.

In step S107, the capacity dispensation unit 12 dispenses a capacity, using the acquired amount dispensation function 231. In a case where the dispensation result is no good, the process is suspended. The dispensation result is obtained as a requested amount/requested value, and, in this example, the capacity dispensation unit 12 dispenses the VLAN-ID "100".

In step S108, the capacity dispensation unit 12 performs registration with respect to the entity DB 22, on the basis of the dispensation result (requested amount/requested value). In this example, the capacity dispensation unit 12 performs capacity consuming entity registration (2205), and dispensed capacity registration for capacity providing entities (2215).

<4> Effects

As described above in detail, in the embodiment of this invention, the management device 1 including the capacity management unit 10 and the management information DB 20 is provided. The management information DB 20 includes the specification DB 21 as the first storage unit and the entity DB 22 as the second storage unit. The first storage unit stores specification information indicating specifications of a plurality of entities including the network 2 and the ICT devices 3 to be managed. The second storage unit stores entity information including information indicating the relationship between the entities. The capacity management unit 10 includes the capacity request acquisition unit 11 and a capacity dispensation unit 12. The capacity request acquisition unit 11 is designed to receive an entity generation request that requests generation of a first entity (a capacity consuming entity 220, for example) with respect to the network 2 or an ICT device 3, read specification information regarding the first entity from the first storage unit, determine whether the first entity has a consumption specification attribute indicating the need of consumption of a resource in the network 2 or of the ICT device 3, and, when the first entity is determined to have the consumption specification attribute, identify a second entity (a capacity providing entity 221, for example) that can provide a capacity of the resource to be consumed by the first entity, on the basis of the entity information stored in the second storage unit. The capacity dispensation unit 12 is designed to determine whether the capacity of the resource to be consumed by the first entity can be dispensed, on the basis of the identified second entity, and dispense the capacity to the first entity when determining that dispensation is possible. Further, when a plurality of entity generation requests is received, the management device 1 dispenses a capacity of a common resource to a plurality of the first entities requested to be generated through the plurality of entity generation requests, on the basis of the second entities identified for each first entity of the plurality of the first entities.

With this arrangement, in the management device 1, the capacities of the resources in the network 2 or of the ICT devices 3 are automatically managed together with information about the entities that consume the resources and the entities that can provide the resources, without the need of a human operator to make any determination. Accordingly, in the network and ICT management system, resource management is automatically conducted, and the work of the operator can be reduced. Further, in the management device 1, the process till the resource capacity dispensation is automatically performed. Accordingly, in the network and ICT management system, resource management can be continuously conducted on the basis of the latest entity information updated as needed, and the work of the operator can also be reduced. Furthermore, when a plurality of entity generation requests is received, the management device 1 dispenses a capacity of a common resource to the first entities requested to be generated through the plurality of entity requests. Accordingly, in the network and ICT management system that does not depend on the network and ICT devices to be managed, resources can be managed in cooperation, and the capacity of the resource common to the first entities can be automatically allocated to the first entities.

Also, in the above embodiment, when a plurality of the entity generation requests is received, the capacity request acquisition unit 11 groups the entity generation requests that require the same amount or value as the capacity of the resource to be consumed, and the capacity dispensation unit 12 determines whether it is possible to dispense the capacity of the common resource to be consumed by the first entities, with the plurality of grouped entity generation requests being a unit. When the dispensation is possible, the capacity of the common resource is dispensed to each of the first entities requested through the plurality of grouped entity generation requests.

As a result, the management device 1 can reliably allocate a consumption resource capacity of the same amount or value to the plurality of first entities that requires a consumption resource capacity of the same amount or value, by grouping the entity generation requests that require a consumption resource capacity of the same amount or value among the plurality of received entity generation requests.

Also, in the above embodiment, the specification information that is stored in the first storage unit and is about the first entity includes constraint condition information indicating other first entities that require the same amount or value as the first entity as the capacity of resource to be consumed, and the capacity request acquisition unit 11 groups the first entities determined to have the consumption specification attribute, on the basis of the constraint condition information.

As a result, in the management device 1, the constraint condition information about the equivalence constraint is stored into the first storage unit in advance, and, when a plurality of received first entities is to be grouped, it is possible to readily form an equivalence constraint group by searching for the entities that require the same amount or value, on the basis of the constraint condition information.

Note that, in the above embodiment, the capacity of the resource to be dispensed may be one of the amounts held as numerical quantities in the second entity, such as a band, a memory, or the number of cores in the CPU, for example. Alternatively, the capacity of the resource to be dispensed may be a value of an identifier that can be used by the second entity, such as a VLAN-ID or an MPLS label, for example.

With this arrangement, in the management device 1, one of the amounts held by the second entity, or the value of the identifier available for the second entity can be dispensed to the first entities requested through a plurality of entity requests.

Further, in the above embodiment, the capacity dispensation unit 12 may update the entity information stored in the second storage unit, using information for identifying the first entity that is the dispensation destination, and information indicating the resource dispensed to the first entity or the capacity of the resource, which is the dispensed requested amount or requested value, as information indicating a result of the dispensation of the capacity to the first entity.

With this arrangement, in the management device 1, the entity information is updated with the use of specific information regarding what kind of dispensation has been performed, and appropriate resource management based on the updated detailed information can be conducted.

Also, in the above embodiment, the first entity is an entity in a logical layer of the network 2 or the ICT device 3 to be managed, the second entity is an entity in a physical layer of the network or the ICT device 3 to be managed, and the capacity request acquisition unit 11 may be designed to receive a request for generation of the entity in the logical layer as the entity generation request, and identify the second entity on the basis of information indicating the relationship between the entity in the logical layer and the entity in the physical layer as the entity information stored in the second storage unit.

With this arrangement, in the management device 1, it is possible to appropriately and automatically manage the resource capacities, using the architecture based on the relationship between the entity in the logical layer and the entity in the physical layer.

OTHER EMBODIMENTS

Note that this invention is not limited to the above embodiment. For example, the functional units included in the management device 1 may be dispersedly arranged in a plurality of devices, and these devices may cooperate with each other to perform processing. Also, each functional unit may be implemented with a circuit. The circuit may be a dedicated circuit that implements a specific function, or may be a general-purpose circuit such as a processor.

The management device 1 can also be formed with a computer and a program, and the program can be recorded in a recording medium or be provided through a network.

Further, the flow in each of the processes described above is not limited to the described procedures, and the order of some steps may be changed, or some steps may be performed simultaneously. Also, the series of processes described above does not need to be carried out continuously in terms of time, and each step may be carried out at any timing.

At least in one of the processes to be performed in each of the above embodiments, a processor mounted in a general-purpose computer can be used as basic hardware, for example. The program for performing the above processes may be stored in a computer-readable recording medium, and be provided. The program is stored in a recording medium as a file in an installable format or a file in an executable format. The recording medium may be a magnetic disk, an optical disk (such as a CD-ROM, a CD-R, or a DVD), a magneto-optical disk (such as an MO), or a semiconductor memory. The recording medium may be any recording medium that can store a program and can be read by a computer. Alternatively, the program for performing the above processes may be stored in a computer (server) connected to a network such as the Internet, and be downloaded into a computer (client) via the network.

In addition to the above, various modifications can be made to the capacity dispensing method and the like, without departing from the scope of this invention.

In short, this invention is not limited to the embodiments described above, and various modifications can be made in the implementation stage without departing from the scope thereof. Also, the respective embodiments may be implemented in a combination, and in that case, combined effects can be obtained. Further, the embodiments described above include various inventions, and various inventions can be extracted by combinations selected from among the disclosed components. For example, even if some components are deleted from all the components described in the embodiment, a configuration from which the components have been deleted can be extracted as an invention, as long as the problem can be solved and the effects can be achieved.

Supplementary Notes

Some or all of the respective embodiments described above can be described as in the following supplementary notes in addition to the claims, but are not limited thereto.

[C1]

A management device (1) including:

a first storage unit (21) that stores specification information indicating specifications of a plurality of entities including a network and an ICT device that are to be managed;

a second storage unit (22) that stores entity information including information indicating a relationship between the plurality of entities;

a request acquisition unit (11) that receives an entity generation request that requests generation of a first entity with respect to the network or the ICT device, reads the specification information regarding the first entity from the first storage unit, determines whether the first entity has a consumption specification attribute indicating a need of consumption of a resource in the network or of the ICT device, and, when the first entity is determined to have the consumption specification attribute, identifies a second entity that can provide a capacity of a resource to be consumed by the first entity on the basis of the entity information stored in the second storage unit; and a capacity dispensation unit (12) that determines, on the basis of the identified second entity, whether dispensation of the capacity of the resource to be consumed by the first entity is possible, and, when the dispensation is determined to be possible, dispenses the capacity to the first entity, wherein, when a plurality of the entity generation requests is received, the capacity dispensation unit dispenses a capacity of a common resource to a plurality of the first entities requested through the plurality of the entity generation requests, on the basis of the second entity identified for each first entity of the plurality of the first entities.

[C2]

The management device according to [C1], wherein, when the plurality of the entity generation requests is received, the request acquisition unit (11) groups the entity generation requests that need the same amount or value as the capacity of the resource to be consumed, and the capacity dispensation unit determines whether dispensation of the capacity of the common resource to be consumed by the plurality of the first entities is possible, with the plurality of the grouped entity generation requests being a unit, and, when the dispensation is determined to be possible, dispenses the capacity of the common resource to each of the first entities requested through the plurality of the grouped entity generation requests.

[C3]

A management method implemented by the management device (1), the management method including:

causing a memory to store specification information indicating specifications of a plurality of entities including a network and an ICT device that are to be managed, and entity information including information indicating a relationship between the plurality of entities;

receiving an entity generation request that requests generation of a first entity with respect to the network or the ICT device;

reading the specification information regarding the first entity from the memory, and determining whether the first entity has a consumption specification attribute indicating a need of consumption of a resource in the network or of the ICT device;

when the first entity is determined to have the consumption specification attribute, identifying a second entity that can provide a capacity of a resource to be consumed by the first entity, on the basis of the entity information stored in the memory;

determining, on the basis of the identified second entity, whether dispensation of the capacity of the resource to be consumed by the first entity is possible; and, when the dispensation is determined to be possible, dispensing the capacity to the first entity, wherein, when a plurality of the entity generation requests is received, a capacity of a common resource is dispensed to a plurality of the first entities requested through the plurality of the entity generation requests, on the basis of the second entity identified for each first entity of the plurality of the first entities.

[C4]

A non-transitory computer-readable storage medium storing an instruction to be executed by a hardware processor, the instruction causing the hardware processor to implement a method that includes:

causing a memory to store specification information indicating specifications of a plurality of entities including a network and an ICT device that are to be managed, and entity information including information indicating a relationship between the plurality of entities;

receiving an entity generation request that requests generation of a first entity with respect to the network or the ICT device;

reading the specification information regarding the first entity from the memory, and determining whether the first entity has a consumption specification attribute indicating a need of consumption of a resource in the network or of the ICT device;

when the first entity is determined to have the consumption specification attribute, identifying a second entity that can provide a capacity of a resource to be consumed by the first entity, on the basis of the entity information stored in the memory;

determining, on the basis of the identified second entity, whether dispensation of the capacity of the resource to be consumed by the first entity is possible; and, when the dispensation is determined to be possible, dispensing the capacity to the first entity, wherein, when a plurality of the entity generation requests is received, a capacity of a common resource is dispensed to a plurality of the first entities requested through the plurality of the entity generation requests, on the basis of the second entity identified for each first entity of the plurality of the first entities.

REFERENCE SIGNS LIST

1 Management device
2 Network
3 ICT device
10 Capacity management unit
11 Capacity request acquisition unit
12 Capacity dispensation unit
20 Management information database
21 Specification database
22 Entity database
23 Function repository
231 Amount dispensation function
232 Value list dispensation (small numbers) function
233 Value list dispensation (large numbers) function
51 CPU
52 RAM
53 Program memory
54 Auxiliary storage device
55 Communication interface
56 Input/output interface
57 Bus
501 Equivalence constraint group
OP Operator

The invention claimed is:

1. A management device comprising a hardware processor and a memory, wherein the memory includes: a first storage unit that stores configured to store specification information indicating specifications of a plurality of entities including a network and an ICT (information and communication technology) device that are to be managed; and a second storage unit that stores configured to store entity information including information indicating a relationship between the plurality of entities, the hardware processor is configured to: receive an entity generation request that requests generation of a first entity with respect to the network or the ICT device; read the specification information regarding the first entity from the first storage unit, to determine whether the first entity has a consumption specification attribute indicating a need of consumption of a resource in the network or of the ICT device; when the first entity is determined to have the consumption specification attribute, identify a second entity capable of providing a capacity of a resource to be consumed by the first entity, on a basis of the entity information stored in the second storage unit; determine, on a basis of the identified second entity, whether dispensation of the capacity of the resource to be consumed by the first entity is possible; when the dispensation is determined to be possible, dispense the capacity to the first entity, and when a plurality of the entity generation requets is received, the hardware processor dispenses a capacity of a common resource to a plurality of the first entities requested through the plurality of the entity generation requests, on a basis of the second entity identified for each first entity of the plurality of the first entities;

the hardware processor is configured to: group the entity generation requests that need the same amount or value as the capacity of the resource to be consumed, when the plurality of the entity generation requests is received; determine whether dispensation of the capacity of the common resource to be consumed by the plurality of the first entities is possible, with the plurality of the grouped entity generation requests being a unit; and when the dispensation is determined to be possible, dispense the capacity of the common resource to each of the first entities requested through the plurality of the grouped entity generation requests;

wherein the specification information that is stored in the first storage unit and is about the first entity includes constraint condition information indicating another first entity that needs the same amount or value as the first entity as the capacity of resource to be consumed, and the hardware processor is configured to group the first entities determined to have the consumption specification attribute on a basis of the constraint condition information, in grouping the entity generation requests.

2. The management device according to The management device according claim 1, wherein the capacity of the resource to be dispensed includes one of amounts held by the second entity, or a value of an identifier available for the second entity.

3. The management device according to claim 1, wherein the hardware processor is configured further to update the entity information stored in the second storage unit, using information for identifying the first entity that is a dispensation destination, and information indicating a resource dispensed to the first entity or a capacity of the dispensed resource, as information indicating a result of the dispensation of the capacity to the first entity.

4. The management device according to claim 1, wherein the first entity is an entity in a logical layer of the network or ICT device to be managed, and the second entity is an entity in a physical layer of the network or ICT device to be managed, and the hardware processor is configured to: receive a request for generation of the entity in the logical layer as the entity generation request; and identify the second entity, on a basis of information indicating a relationship between the entity in the logical layer and the entity in the physical layer as the entity information stored in the second storage unit.

5. A management method implemented by a management device that includes a hardware processor and a memory, the management method comprising: the management method causing the hardware processor to: cause storing in a first storage unit, in the memory, to store specification information indicating specifications of a plurality of entities including a network and an ICT ((information and communication technology) device that are to be managed, and storing in a second storage unit, entity information including information indicating a relationship between the plurality of entities; receive receiving an entity generation request that requests generation of a first entity with respect to the network or the ICT device; reading the specification information regarding the first entity from the memory, to determine whether the first entity has a consumption specification attribute indicating a need of consumption of a resource in the network or of the ICT device; when the first entity is determined to have the consumption specification attribute, identifying a second entity capable of providing a capacity of a resource to be consumed by the first entity, on a basis of the entity information stored in the memory; determine, determining, on a basis of the identified second entity, whether dispensation of the capacity of the resource to be consumed by the first entity is possible; when the dispensation is determined to be possible, dispense dispensing the capacity to the first entity, wherein, and when a plurality of the entity generation requests is received, the hardware processor dispenses dispensing a capacity of a common resource to a plurality of the first entities requested through the plurality of the entity generation requests, on a basis of the second entity identified for each first entity of the plurality of the first entities;

the hardware processor is configured to: group the entity generation requests that need the same amount or value as the capacity of the resource to be consumed, when the plurality of the entity generation requests is received; determine whether dispensation of the capacity of the common resource to be consumed by the plurality of the first entities is possible, with the plurality of the grouped entity generation requests being a unit; and when the dispensation is determined to be possible, dispense the capacity of the common resource to each of the first entities requested through the plurality of the grouped entity generation requests;

wherein the specification information that is stored in the first storage unit and is about the first entity includes constraint condition information indicating another first entity that needs the same amount or value as the first entity as the capacity of resource to be consumed, and the hardware processor is configured to group the first entities determined to have the consumption specification attribute on a basis of the constraint condition information, in grouping the entity generation requests.

6. The management method according to claim 5, further comprising: grouping the entity generation requests that need the same amount or value as the capacity of the resource to be consumed, when the plurality of the entity generation requests is received; determining whether dispensation of the capacity of the common resource to be consumed by the plurality of the first entities is possible, with the plurality of the grouped entity generation requests being a unit; and when the dispensation is determined to be possible, dispensing the capacity of the common resource to each of the first entities requested through the plurality of the grouped entity generation requests.

7. The management method according to claim 6, wherein the specification information is about the first entity includes constraint condition information indicating another first entity that needs the same amount or value as the first entity as the capacity of resource to be consumed, and the management method further comprises grouping the first entities determined to have the consumption specification attribute on a basis of the constraint condition information, in grouping the entity generation requests.

8. The management method according to claim 5, wherein the capacity of the resource to be dispensed includes one of amounts held by the second entity, or a value of an identifier available for the second entity.

9. The management method according to claim 5, further comprising: updating the entity information stored in the second storage unit, using information for identifying the first entity that is a dispensation destination, and information indicating a resource dispensed to the first entity or a capacity of the dispensed resource, as information indicating a result of the dispensation of the capacity to the first entity.

10. The management method according to claim 5, wherein the first entity is an entity in a logical layer of the network or ICT device to be managed, and the second entity is an entity in a physical layer of the network or ICT device to be managed, and the management method further comprises: receiving a request for generation of the entity in the logical layer as the entity generation request; and identifying the second entity, on a basis of information indicating a relationship between the entity in the logical layer and the entity in the physical layer as the entity information stored in the second storage unit.

11. A non-transitory computer-readable storage medium storing a management program includes a hardware processor that when executed by a processor, causes a the processor to perform operations comprising: storing in a first storage unit, specification information indicating specifications of a plurality of entities including a network and an ICT ((information and communication technology) device that are to be managed, and storing in a second storage, entity information including information indicating a relationship between the plurality of entities; receiving an entity generation request that requests generation of a first entity with respect to the network or the ICT device; reading the specification information regarding the first entity from the memory, to determine whether the first entity has a consumption specification attribute indicating a need of consumption of a resource in the network or of the ICT device; when the first entity is determined to have the consumption specification attribute, identifying a second entity capable of providing a capacity of a resource to be consumed by the first entity, on a basis of the entity information stored in the memory; determining, on a basis of the identified second entity, whether dispensation of the capacity of the resource to be consumed by the first entity is possible; when the dispensation is determined to be possible, dispensing the capacity to the first entity; and when a plurality of the entity generation requests is received, dispensing a capacity of a common resource to a plurality of the first entities requested through the plurality of the entity generation requests, on a basis of the second entity identified for each first entity of the plurality of the first entities;

the hardware processor is configured to: group the entity generation requests that need the same amount or value as the capacity of the resource to be consumed, when the plurality of the entity generation requests is received; determine whether dispensation of the capacity of the common resource to be consumed by the plurality of the first entities is possible, with the plurality of the grouped entity generation requests being a unit; and when the dispensation is determined to be possible, dispense the capacity of the common resource to each of the first entities requested through the plurality of the grouped entity generation requests;

wherein the specification information that is stored in the first storage unit and is about the first entity includes constraint condition information indicating another first entity that needs the same amount or value as the first entity as the capacity of resource to be consumed, and the hardware processor is configured to group the first entities determined to have the consumption specification attribute on a basis of the constraint condition information, in grouping the entity generation requests.

12. The non-transitory computer-readable storage medium according to claim 11, the operations further comprising: grouping the entity generation requests that need the same amount or value as the capacity of the resource to be consumed, when the plurality of the entity generation requests is received; determining whether dispensation of the capacity of the common resource to be consumed by the plurality of the first entities is possible, with the plurality of the grouped entity generation requests being a unit; and when the dispensation is determined to be possible, dispensing the capacity of the common resource to each of the first entities requested through the plurality of the grouped entity generation requests.

13. The non-transitory computer-readable storage medium according to claim 12, wherein the specification information is about the first entity includes constraint condition information indicating another first entity that needs the same amount or value as the first entity as the capacity of resource to be consumed, and the operations further comprise grouping the first entities determined to have the consumption specification attribute on a basis of the constraint condition information, in grouping the entity generation requests.

14. The non-transitory computer-readable storage medium according to claim 11, wherein the capacity of the resource to be dispensed includes one of amounts held by the second entity, or a value of an identifier available for the second entity.

15. The non-transitory computer-readable storage medium according to claim 11, the operations further comprising: updating the entity information stored in the second storage unit, using information for identifying the first entity that is a dispensation destination, and information indicating a resource dispensed to the first entity or a capacity of the dispensed resource, as information indicating a result of the dispensation of the capacity to the first entity.

16. The non-transitory computer-readable storage medium according to claim 11, wherein the first entity is an entity in a logical layer of the network or ICT device to be managed, and the second entity is an entity in a physical layer of the network or ICT device to be managed, and the operations further comprise: receiving a request for generation of the entity in the logical layer as the entity generation request; and identifying the second entity, on a basis of information indicating a relationship between the entity in the logical layer and the entity in the physical layer as the entity information stored in the second storage unit.

* * * * *